United States Patent
Di Benedetto et al.

(10) Patent No.: US 9,444,723 B1
(45) Date of Patent: Sep. 13, 2016

(54) PASSING DATA OVER VIRTUAL LINKS

(71) Applicant: Cisco Technology, Inc., San Jose, CA (US)

(72) Inventors: Marco Di Benedetto, Santa Clara, CA (US); Pierluigi Rolando, San Jose, CA (US); Thomas Vincent Flynn, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 229 days.

(21) Appl. No.: 14/156,328

(22) Filed: Jan. 15, 2014

(51) Int. Cl.
*G06F 15/16* (2006.01)
*H04L 12/721* (2013.01)

(52) U.S. Cl.
CPC .................................. *H04L 45/14* (2013.01)

(58) Field of Classification Search
CPC ........... H04L 12/4633; H04L 2212/00; H04L 69/324
USPC ........................................................ 709/228
See application file for complete search history.

(56) References Cited

U.S. PATENT DOCUMENTS

| | | | | |
|---|---|---|---|---|
| 7,782,841 B2* | 8/2010 | Rampal | ................... | H04L 12/46 370/352 |
| 8,243,627 B2* | 8/2012 | Baum | ................ | H04L 12/4641 370/256 |
| 8,750,164 B2* | 6/2014 | Casado | ............... | H04L 12/4633 370/254 |
| 2005/0138206 A1* | 6/2005 | Moreels | ................ | H04L 12/462 709/245 |
| 2010/0138937 A1* | 6/2010 | Urade | ................ | C12N 15/8509 800/3 |
| 2011/0153793 A1* | 6/2011 | Tan | ...................... | H04L 63/0272 709/222 |
| 2013/0275592 A1* | 10/2013 | Xu | .......................... | H04L 45/14 709/225 |
| 2013/0318219 A1* | 11/2013 | Kancherla | ............... | H04L 49/70 709/222 |
| 2014/0181267 A1* | 6/2014 | Wadkins | ............... | H04L 69/163 709/219 |
| 2015/0244617 A1* | 8/2015 | Nakil | ...................... | H04L 45/70 709/224 |

* cited by examiner

*Primary Examiner* — Phuoc Nguyen

(57) ABSTRACT

Passing data over virtual links is disclosed, including: encapsulating a layer three data packet as an inner payload of a network data packet; and generating an outer header of the network data packet with a layer two header and a layer three header, wherein the network data packet is configured to communicate over a virtual link between a first interface of a first network appliance and a first interface of a second network appliance.

25 Claims, 14 Drawing Sheets

US 9,444,723 B1

PASSING DATA OVER VIRTUAL LINKS

BACKGROUND OF THE INVENTION

In certain applications, it is desirable to restrict communication among different network nodes for various reasons. Some of such reasons include, for example, to improve the security of passing information to the appropriate device, to engineer desirable traffic patterns (e.g., force entity A and entity B to talk to each other through entity C, that might monitor, rate limit, firewall, etc.), to reuse resources (e.g., several devices attached to the same wire can reuse IP addresses), and to partition domains to increase scalability. Conventionally, virtual local area networks (VLANs) may be used to restrict communication at layer two. A VLAN provides a broadcast domain and devices that are part of the same VLAN are able to communicate to each other but generally not to devices of a different VLAN. A VLAN may be implemented by configuring one or more layer two switches.

BRIEF DESCRIPTION OF THE DRAWINGS

Various embodiments of the invention are disclosed in the following detailed description and the accompanying drawings.

DETAILED DESCRIPTION

Figure 1:
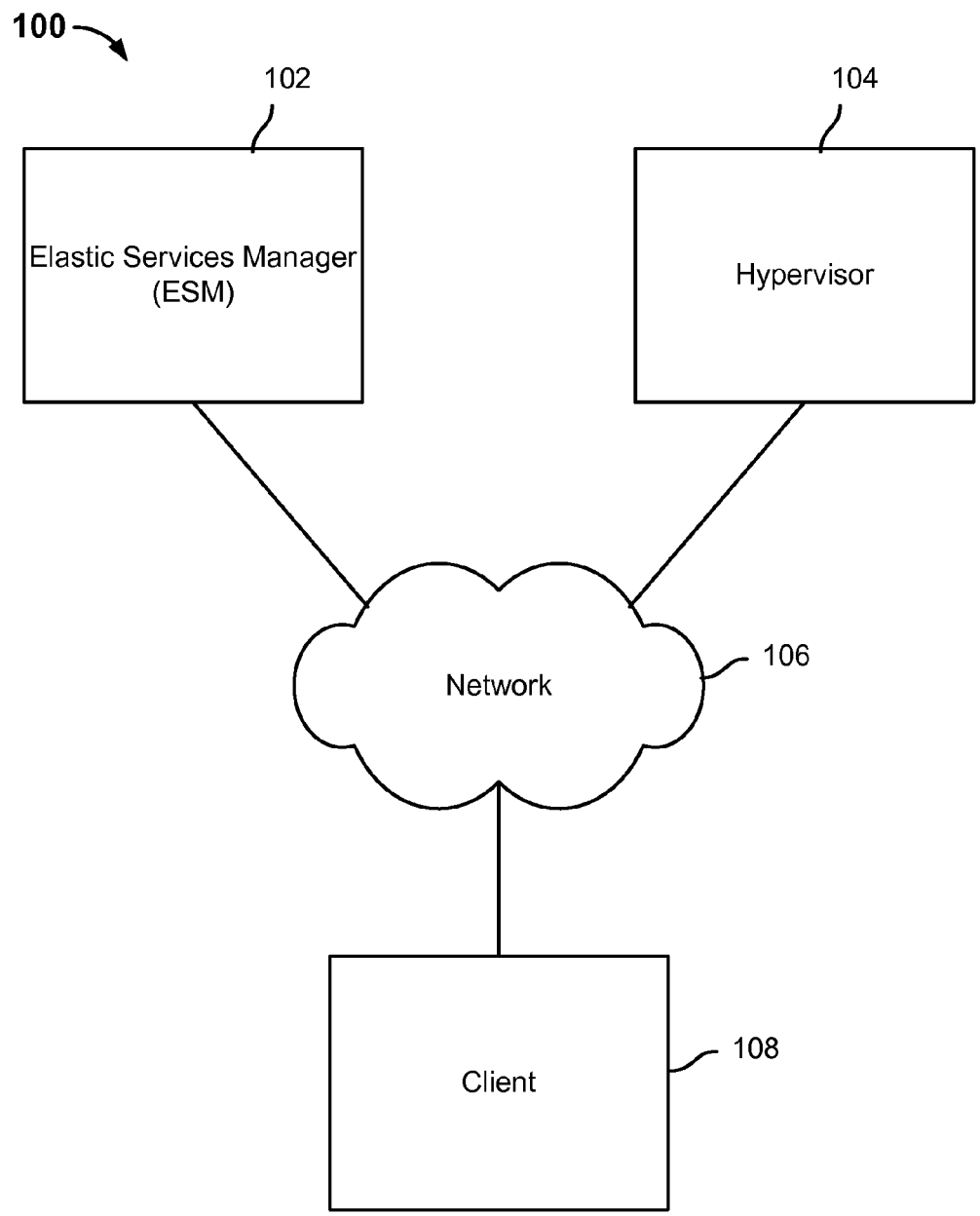
FIG. 1 is a diagram showing a system for establishing virtual links in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of virtual links for network appliances are described herein. In various embodiments, a network appliance comprises a physical appliance or a virtual appliance. In some embodiments, a "virtual appliance" refers to one or more virtual machines that are configured to perform one or more services. A "virtual appliance" may also sometimes be referred to as a "VA." For example, a network appliance can be configured to perform one or more network services, such as a firewall, a load balancer, a virtual private network, and an intrusion detection system. Network appliances can be provisioned, configured to perform a particular service, and added to a network topology. A virtual link may be provisioned to connect two network appliances so that traffic may be passed between the network appliances over the virtual link. In various embodiments, traffic over a virtual link may be passed between two virtual appliances, two physical appliances, and/or one virtual appliance and one physical appliance. For purposes of illustration, in several of the examples described below, a virtual link is referred to as carrying traffic between a pair of virtual appliances.

In various embodiments, a "virtual link" comprises a layer three (network layer) tunnel that carries layer two (data layer) and/or layer three traffic between a pair of network appliances. A "virtual link" may also sometimes be referred to as a "layer three overlay." One interface of a first network appliance can be configured to communicate to one interface of a second network appliance over a virtual link. Put another way, a virtual link comprises a point-to-point tunnel that can carry traffic across a network from one interface of a network appliance to another interface of a different network appliance. Virtual links may be used to create a private overlay topology over an existing common network or shared networking infrastructure for the purpose of enabling a dedicated communication medium between the two network appliances. Because only two interfaces belonging to different network appliances can exchange data over a virtual link, establishing the virtual link between the two network appliances is similar to allocating a dedicated network segment for those network appliances. Virtual links may be used to create a private overlay topology over an existing common network or shared networking infrastructure without the need to modify the underlying networking infrastructure. For example, VLANs may be used to create a dedicated channel, but the number of VLANs that can be used are limited (e.g., 4,000 VLANs). VXLANS may be used to create a dedicated channel, but using a VXLAN requires setting up a form of broadcast emulation, which is more than is needed to create a point-to-point link. Also, while a physical cable can be used to create a dedicated channel, a server may only have few Ethernet ports available and it may be operationally disruptive to add cables as needed. Virtual links provide a low cost (e.g., in terms of set up time and resources needed) solution of providing a dedicated network segment, as will be described below. Virtual links are also able to span across layer three boundaries (e.g., virtual link packets can be passed by routers from one layer three interface to another layer three interface) to connect appliances located in non-adjacent layer two topologies. In some embodiments, virtual links may be configured to span across layer four boundaries (e.g., through adding a layer four header in the encapsulation of virtual link packets).

FIG. 1 is a diagram showing a system for establishing virtual links in accordance with some embodiments. In the example, system 100 includes elastic services manager (ESM) 102, hypervisor 104, network 106, and client 108. As mentioned before, while virtual links may be used to connect physical and/or virtual appliances, in the example of FIG. 1, virtual links are used to connect virtual appliances.

In some embodiments, ESM 102 is configured to provision and manage virtual appliances. ESM 102 may be implemented using software and/or hardware. In some embodiments, ESM 102 maintains data that tracks a pool of physical and/or logical resources that are available to use to create virtual appliances. For example, ESM 102 receives a request to provision two virtual appliances that can communicate to each other for a particular user. For example, each requested virtual appliance is requested to perform a particular network service. For example, the request may be input into a user interface at client 108 and sent over network 106 to ESM 102. In response to the request, ESM 102 is configured to check whether the physical and/or logical resources required to provision the two requested virtual appliances are available (e.g., using its stored data) and in the event that the required resources are available, ESM 102 is configured to send a request to hypervisor 104 (and in some embodiments, in addition to one or more other hypervisors that are not shown in the diagram) to allocate the virtual machines for the requested virtual appliances. An example of hypervisor 104 is VMware ESXi. ESM 102 then configures the one or more virtual machines allocated by hypervisor 104 for each of the two requested network services to create the two virtual appliances.

ESM 102 is configured to provision and manage virtual links between any two virtual appliances. For example, ESM 102 may provision a virtual link to connect two virtual appliances that were also provisioned by ESM 102, provisioned by another ESM, or were otherwise created/obtained. ESM 102 does not necessarily provision virtual links for only virtual appliances that ESM 102 itself had provisioned. Returning to the example where ESM 102 had provisioned the two virtual appliances, ESM 102 sends the virtual link configuration to the two virtual appliances to configure one interface of the first virtual appliance to communicate with one interface of the second virtual appliance, thereby creating a virtual link between the two virtual appliances. ESM 102 then publishes the two virtual appliances to the appropriate user of the virtual appliances and the user can configure the first and second virtual appliances such that traffic may flow between them over the virtual link. The users can add the two virtual appliances into one of its network topologies.

In some embodiments, ESM 102 is administered by an ESM administrator. For example, the ESM administrator is a user that manipulates the ESM by calling the ESM's (e.g., REST) APIs either directly or through a user interface and/or command-line interface.

A chain of two or more virtual appliances can be provisioned (e.g., by ESM 102 or another entity) and each such virtual appliance may be configured to communicate to an adjacent virtual appliance over a virtual link that is provisioned by ESM 102 (or another ESM that is not shown in the diagram). For example, a chain of two of more virtual appliances may include a router virtual appliance linked to a firewall virtual appliance, which is also linked to a load balancer virtual appliance. In some embodiments, neither an ESM nor any other party may have any role in forwarding data across a virtual link, apart from the two virtual appliances that are connected by the virtual link.

In some embodiments, virtual appliances connected by a virtual link have the capability of establishing and maintaining the link as configured by ESM 102 even though an administrator of the virtual appliance itself has no knowledge of the virtual link or behaves in an adversarial manner (i.e., the administrator of the virtual appliance tries to disable the virtual link). This is possible because, in some embodiments, a virtual appliance supports two management roles: one of which is the provisioning administrator, which is operated by an ESM (or other orchestration tool) on behalf of the ESM (or other orchestration tool) administrator, and the other one is the "normal" administrator of a virtual appliance, whose traffic will be processed by the virtual appliance. The ESM administrator (e.g., a user) provides virtual link configuration to the virtual appliance. From the virtual appliance perspective, this virtual link configuration comes from the provisioning administrator, and is transparent to and cannot be overridden by the normal administrator of the virtual appliance. Thus, the provisioning administrator can enforce policies (e.g., associated with the virtual links) that the administrator of a virtual appliance cannot override. The provisioning administrator is not the ESM administrator (i.e., the ESM administrator cannot use his/her credentials to control the virtual appliances automatically). The provisioning administrator can be thought of rather as a (non-user) proxy for the ESM to do something on a virtual appliance (via using the provisioning administrator's credentials) in a way that cannot be undone by the normal administrator of the virtual appliance. For example, the ESM administrator may configure the ESM, and as a result of this, the ESM might configure a virtual appliance using the provisioning administrator credentials. Therefore, actions of the provisioning administrator are originally triggered by something the ESM administrator has done (either directly or through some other configuration items that were provided some time before). But to reiterate, the ESM administrator does not have access to the virtual appliance directly—the only way he/she can act on the virtual appliance is indirectly, as mediated by the ESM. As an example, in addition to virtual link configuration, the provisioning administrator (e.g., based on direction from an ESM) also provides a virtual appliance name, a virtual appliance management address, a high-availability configuration, etc.

Only a provisioning administrator associated with a virtual appliance can generate, modify, and/or control virtual links for the virtual appliance. In some embodiments, the existence of the virtual links and the configuration of the virtual links remain transparent to a normal administrator of the virtual appliances and the normal administrator of the virtual appliances cannot modify the virtual links. However, in some embodiments, while a normal administrator of the virtual appliances cannot configure/modify a virtual link, the normal administrator can configure the interfaces connected by the virtual link. In some embodiments, a provisioning administrator (e.g., based on an instruction from ESM 102) may remove the virtual link property from an interface of a virtual appliance and as a result, the interface will be shut down (i.e., no packets will be transmitted or received) until a new virtual link is configured to use that interface.

In some embodiments, a virtual appliance that implements a virtual link has two interfaces associated with each user-visible, virtual link-enabled interface: the first interface is an "outer" interface, which is used to send and receive packets to/from the network, and the second interface is an "inner" interface that is used to carry user traffic. In some embodiments, the provisioning administrator can configure the outer interface (e.g., assign an IP address to the outer interface) while the normal administrator of the virtual appliance can configure the inner interface (e.g., assign an IP address to the inner interface).

In some embodiments, when one interface of a virtual link stops functioning properly, the other interface of the virtual link will still be configured as the interface of the virtual link but the operational status of the virtual link itself and of the remaining, functional interface on the virtual appliance will be reported as inactive (or "down" or equivalent). In some embodiments, one or more of the following entities store data associated with the configuration and operational status of a virtual link: the ESM(s) that manages the virtual appliances that are connected by the virtual link and each of the virtual appliances that are connected by the virtual link. In some embodiments, since the lifecycle (including deletion) of the virtual appliances is managed by their ESM, knowledge or command of the deletion of a virtual appliance is sufficient to delete the virtual link itself. In some embodiments, when a virtual appliance is deleted, any virtual links associated with that virtual appliance are also deleted. In contrast to having used a VLAN (or undertake any other network infrastructure action) to create a dedicated network segment between two interfaces of two respective virtual appliances, the physical network (e.g., a layer two switch of the network) does not need to be reconfigured each time a virtual appliance is added to the network topology, each time a virtual appliance is migrated to a different device, or in response to the occurrence of another configuration change.

Because establishing a virtual link between one respective interface of each of two virtual appliances allows data to be sent securely between those two interfaces, virtual links may be used in a variety of applications to restrict communication among network nodes that belong to different parties.

In a first example application, virtual links may be used to restrict communication between each tenant in a multi-tenancy. For example, an Internet Service Provider (or sometimes referred to as an "ISP") provides network infrastructure that may be shared by multiple of its customers, each of which may also be referred to as a tenant. It is desirable to restrict communication between each different tenant because the ISP might not want (or be able) to allocate a dedicated VLAN (or reconfigure its networking infrastructure) to each pair of virtual appliances in a chain or to each tenant, while at the same time this allocation would be required because, for example, each tenant wants to use overlapping IP address ranges.

Therefore, pairs of virtual appliances requested by a tenant may be linked by virtual links so as to ensure that traffic passing between the virtual appliances belongs only to that tenant and cannot be received by any virtual appliance that is allocated to a different tenant. In a first ISP-related use case: multiple tenants may be stacked on the same physical layer two network and the virtual link may be used to maintain isolation between the tenants (e.g., without using VLANs for every per-tenant appliance-to-appliance link). In this first use case, the "intra-cloud" use case, there's a single layer two physical network, and users can be segmented in many ways. In a second ISP-related use case: a tenant is allowed to connect two of its appliances, one sitting in one physical layer two network, the other sitting in a different, disjoint layer two network; in this use case, the two layer two physical networks are attached only via routing (layer three), and typically controlled by firewalls. In this second use case, the "cloud-to-managed-hosting" use case, a VLAN cannot span across. Use of a virtual link in this second use case enables a span across three boundaries (at minimum cost) and the fact that the firewall does not need any rule changes, which would be required if the physical layer three topology was used. An example of using virtual links in the application of an ISP and its tenants is described with FIG. 3 further below.

In a second example application, virtual links can be used to restrict communication between each of multiple applications belonging to an enterprise. An enterprise may desire to logically partition the traffic for different applications. Examples of applications include email, voice over Internet Protocol (VoIP), automated billing systems, and customer relationship management. It is desirable to restrict communication between each different application of the same enterprise for several reasons. Typical applications are often designed in tiers. The following are three example layers: the outermost tier handles the web interface, the next tier is an application logic tier that processes user requests, and the next tier is a database tier that stores persistent data. In this example, the web front tier may not need to communicate directly with the database backend because the data stored in the database is usually not useful to users without first being processed by the application logic. What is more, a direct access to the database backend by the web front end is usually a sign of malicious activity and must be detected and prevented. Another important reason for isolating application components is to be able to describe which component of which application needs which resource. If a resource catalog is built properly, then a whole application can be replicated without too much effort. This can be performed much more easily if each application component draws its resources from a private, dedicated pool, as it will be clear that only other users of that resource pool will be allowed to interact with that component. If there is only a single global pool of resources, then in line of principle, anyone can interact with anyone else and the replication of the application is much harder to achieve. Pairs of virtual appliances that are allocated to each application may be linked by virtual links so as to ensure that traffic passing between the virtual appliances belongs only to that application and cannot be received by any virtual appliance that is allocated to a different application.

Figure 2:
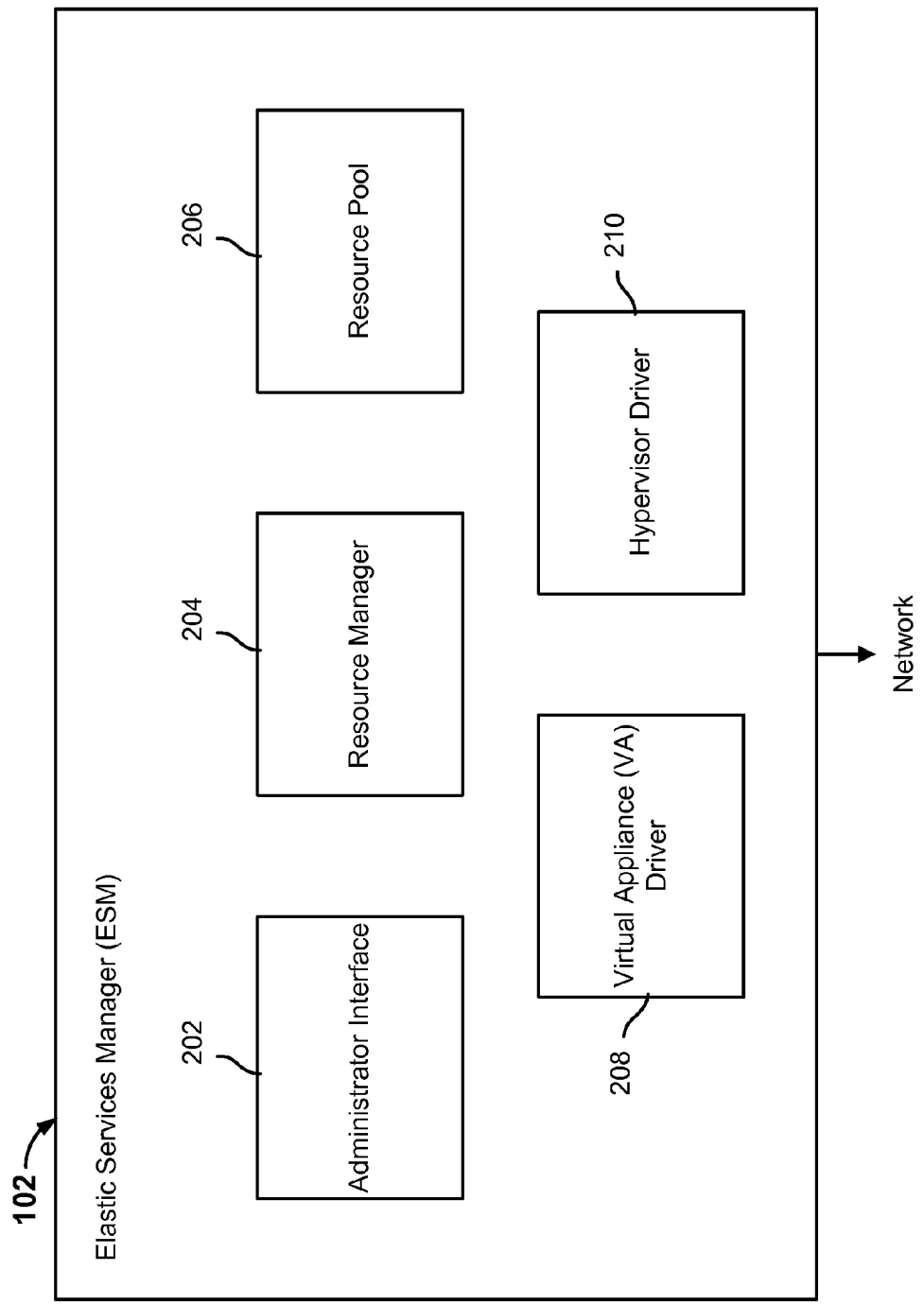
FIG. 2 is a diagram showing an example of an elastic services manager (ESM) in accordance with some embodiments.

FIG. 2 is a diagram showing an example of an elastic services manager (ESM) in accordance with some embodiments. As mentioned before, while virtual links may be used to connect physical and/or virtual appliances, in the example of FIG. 2, virtual links are used to connect virtual appliances. In some embodiments, ESM 102 of system 100 of FIG. 1 may be implemented as the example described in FIG. 2. In the example, the ESM includes administrator interface 202, resource manager 204, resource pool 206, virtual appliance (VA) driver 208, and hypervisor driver 210. Each of administrator interface 202, resource manager 204, resource pool 206, VA driver 208, and hypervisor driver 210 may be implemented using software and/or hardware.

Administrator interface 202 is configured to receive input from users (e.g., an ESM administrator). For example, administrator interface 202 is configured to provide a local or remote user interface through which a user may input information. In some embodiments, the user inputs are received via a Representational State Transfer (REST) application programming interface (API). In some embodiments, administrator interface 202 receives a request to provision one or more virtual appliances and that at least some pairs of the virtual appliances are able to communicate to each other. For example, the request may be made by a tenant in a multitenancy (e.g., a customer of an ISP) scenario or on behalf of an application of an enterprise. For example, the request may include information associated with the number of requested virtual appliances, a number of interfaces of each virtual appliance, which interface one virtual appliance is to use to exchange data with another virtual appliance, a network service (e.g., firewall, load balancing, or other network service) to be performed by each virtual appliance, and a particular user (e.g., tenant or application) to which the virtual appliances are to be allocated. Administrator interface 202 is also configured to translate the request, if needed, and forward (the translated) request to resource manager 204.

In some embodiments, administrator interface 202 is configured to track (at the user interface) operational status information associated with a virtual link. Operational status information includes, for example, whether a first interface associated with a virtual link is active or inactive, whether a second interface associated with a virtual link is active or inactive, and whether the virtual link is active or inactive. For example, in the event that the ESM has received indications that either or both interfaces of a virtual link are inactive, an alert message associated with the inactive components may be displayed at the user interface or otherwise sent to an administrator associated with the ESM. The ESM administrator may attempt to reconfigure the virtual link and/or inform the user of the two virtual appliances connected by the virtual link of the inactive operational status of communication between the two virtual appliances.

Resource manager 204 is configured to receive requests for provisioning virtual appliances forwarded by administrator interface 202. In some embodiments, resource manager 204 is a component of one specific ESM, rather than of multiple ESMs. Resource manager 204 is configured to determine which physical resources and/or logical resources are needed to service each request. Resource pool 206 is configured to maintain updated data associated with the physical and/or logical resources that are available (e.g., to use to generate new virtual appliances) and that are unavailable (e.g., unavailable resources may include resources that have already been assigned to existing virtual appliances). Examples of physical and/or logical resources tracked by resource pool 206 include physical servers, server blades, central processing units (CPUs), memory, network interface cards, VLAN numbers, IP addresses, and sets of network addresses. In some embodiments, resource manager 204 is configured to check with resource pool 206 to determine whether the physical and/or logical resources required to process each request are available. In the event that resource pool 206, internal to the ESM, informs resource manager 204, internal to the ESM, that the resources required to process a request are available, resource manager 204 is configured to send a message including the request to hypervisor driver 210, internal to the ESM, to be passed (e.g., over a network) to a hypervisor (not shown in FIG. 2) that is external to the ESM. In some embodiments, the message sent to hypervisor driver 210 may include the original request for one or more virtual appliances and also additional specifications for the virtual appliances such as, for example, which and/or how much of each resource to use to provision each virtual appliance.

Hypervisor driver 210 is configured to translate messages from the ESM to a format that can be understood by a hypervisor (that is external to the ESM) and to send the translated messages to the hypervisor. In some embodiments, hypervisor driver 210 is configured to receive messages and translate messages from resource manager 204 and send the translated messages to the hypervisor (e.g., via a REST or proprietary API). The hypervisor will generate the appropriate number of virtual machines for each requested virtual appliance and will also create or reconfigure other network resources that each virtual machine is attached to (e.g., virtual switches).

Virtual appliance driver 208 is configured to translate directives from the ESM into directives that can be understood by a virtual appliance, which comprises one or more virtual machines. After the virtual machine(s) are provisioned by the hypervisor, virtual appliance driver 208 is configured to send translated directives to the virtual appliances to configure such one or more virtual machines to serve as each requested virtual appliance. The translated directives sent to the virtual appliances (e.g., via a REST API) may include, for example, but are not limited to: which interface (and its associated internet protocol (IP) address) of one virtual appliance is configured to become a virtual link outer interface (e.g., able to pass data over a virtual link), which virtual link outer interface (and its associated IP address) of another virtual appliance (e.g., using information included in the request for virtual appliances) to which data is to be passed, the network service(s) to be performed by each virtual appliance, an IP address and UDP port of the local outer interface of the virtual link, an IP address and UDP port of the remote outer interface of the virtual link, an IP address of a gateway router that is required to communicate with the remote outer interface of the virtual link (unless both outer interfaces are attached to the same network), and a quality of service value (e.g., DSCP code) to qualify virtual link packets whenever quality of service is required to provide different service levels to different virtual links. While in the example of FIG. 2, a virtual link is provisioned for newly provisioned virtual appliances, a virtual link may also be provisioned for one or more existing appliances (e.g., that were previously provisioned by the same ESM that provisioned the virtual link or by another ESM) as well.

In some embodiments where the ESM is provisioning virtual links for non-virtual appliances (e.g., physical appliances), an additional driver (not shown in FIG. 2) that is configured to translate directives from the ESM into directives that can be understood by non-virtual appliances may be included as a component of the ESM.

In some embodiments, an interface of a virtual appliance that is provisioned as virtual link-enabled will remain virtual link-enabled for its lifetime. In some embodiments, the creation and removal of network interfaces from a virtual appliance is supported at provisioning time (i.e., a user can decide how many interfaces a virtual appliance should have, and which ones will be implemented using a virtual link) or at run time (i.e., while a virtual appliance is running, an interface can be added or removed from the system without shutting down the whole appliance) or when the virtual appliance is in a ready/parked state (i.e., the appliance exists as a logical entity in the ESM and might be totally or partially configured but it is not running and there are no virtual machines actually created on any hypervisor to implement that virtual appliance).

Once the requested virtual appliances and their associated virtual links are configured by the ESM, virtual appliance driver 208 is configured to publish the virtual appliances for the user of the virtual appliances. For example, the user of the virtual appliances may be a tenant in a multitenancy that had requested the virtual appliances or an application used by an enterprise for which the virtual appliances were requested. The user (e.g., normal administrator) of the virtual appliances can push configuration information to the virtual appliances such that traffic may be exchanged between pairs of virtual appliances. Therefore, a virtual link-enabled interface appears as a regular network interface to the appliance user and, in some embodiments, all the configuration items that are needed to configure a regular network interface are also needed to configure a virtual link-enabled interface. Example configuration information that the user of the virtual appliance may provide to the virtual appliance includes a local IP address and subnet mask. Additional example configuration information may include routes, firewall rules, network address translation rules, whether the interface should be administratively up or down, and VPN configuration. While transparent to the users, the traffic exchanged between each pair of virtual appliances is actually tunneled between one interface of each virtual appliance over a virtual link.

In some embodiments, a configured virtual appliance includes a management interface that the virtual appliance may use to periodically send data (e.g., via a REST API) back to virtual appliance driver 208. After a pair of virtual appliances is configured by its user to communicate to each other, user traffic data may be passed between the virtual link. As will be further described below, in response to certain events (e.g., a lack of received user traffic data over a configured interval), a virtual appliance is configured to check on the operational status of the local interface that is associated with a virtual link. Then the virtual appliance may send an operational status message back to the ESM based on its check of the local interface. In some embodiments, the operational status message sent back to the ESM via virtual appliance driver 208 can indicate that at least a portion of the virtual link is active or inactive. Virtual appliance driver 208 may process the operational messages received from one or more virtual appliances to determine whether any virtual links are inactive. For example, in the event that virtual appliance driver 208 receives a message that indicates that one virtual link-enabled interface is inactive, virtual appliance driver 208 may determine that the entire virtual link associated with the inactive interface is also inactive. In some embodiments, virtual appliance drivers will report the determined operational status of virtual link-enabled interfaces and/or virtual links back to administrator interface 202, which can update its presented information regarding the operational status (e.g., active or inactive) of each interface of a virtual link and/or the virtual link itself. The virtual appliances may send data other than operational status information to virtual appliance driver 208.

While the ESM can be responsible for reporting the operational statuses of virtual link-enabled interfaces and/or virtual links, in some embodiments, it is also possible for a user (e.g., an administrator or an operator) of the virtual appliance to bypass the ESM and directly access the operational status of a virtual appliance. In some embodiments, in such direct access by the user of the virtual appliance, the amount of information received is less than what may be reported by the ESM (as only the local interface is accessible to the user of the virtual appliance). The user of the virtual appliance might not know that a problem with the virtual appliance is caused by an associated virtual link, but will be able to figure out on its own (without asking the provisioning administrator associated with the ESM) that there is indeed a problem. For example, there could be an additional role supported by the virtual appliance (in addition to the aforementioned provisioning administrator and normal administrator) which is the operator role. For example, the operator may have read-only access to all configuration information the normal administrator has access to, including the operational status. To access the confirmation, the operator may use a graphic interface and/or a command-line interface. If the operator is also in charge of the networking infrastructure, it will know which interfaces are virtual link-enabled and how to troubleshoot them; if not, it can contact whoever is in charge of the networking infrastructure, which, for example, may be the ESM administrator.

Figure 3:
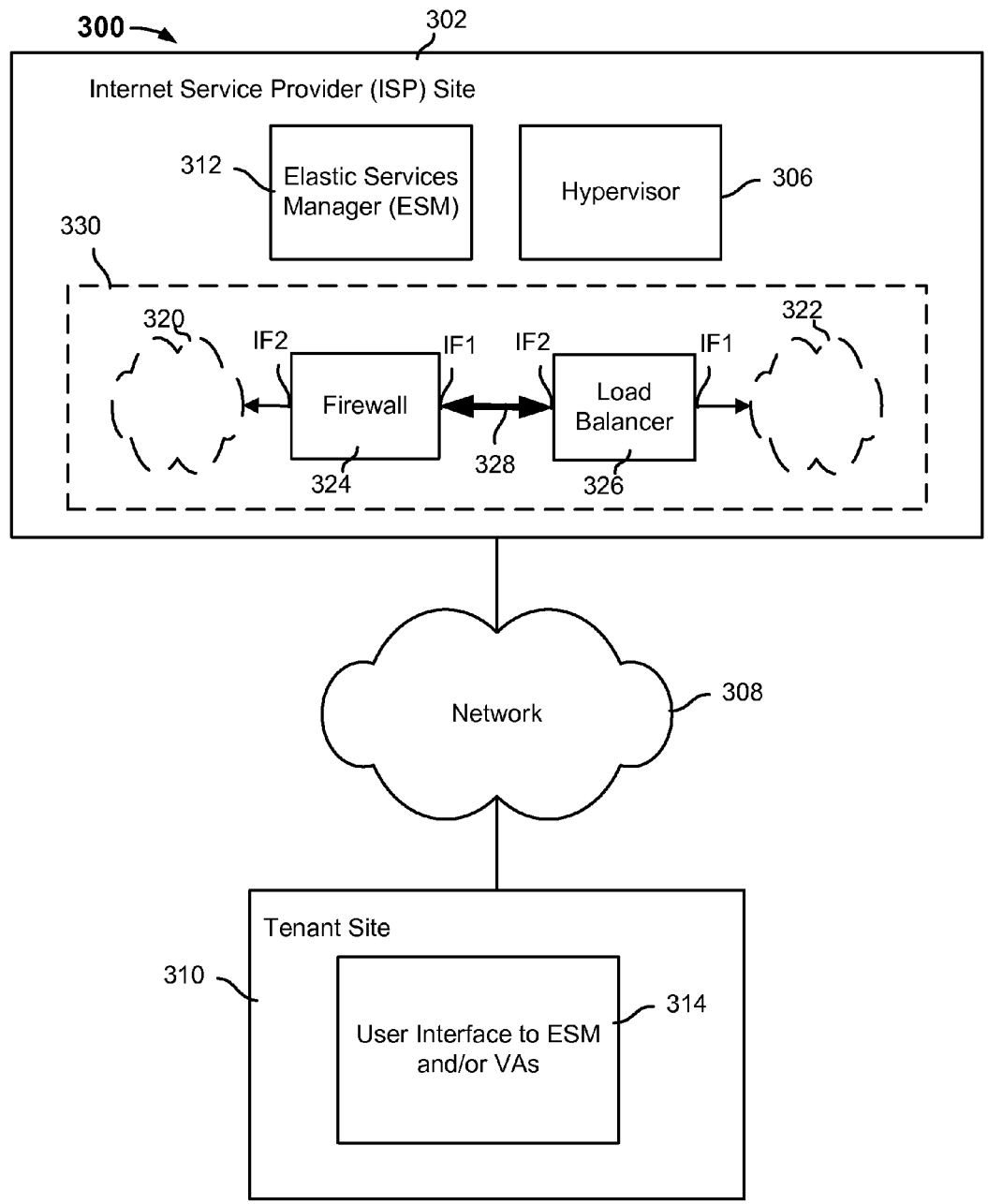
FIG. 3 is a diagram showing a system of establishing virtual links in accordance with some embodiments.

FIG. 3 is a diagram showing a system of establishing virtual links in accordance with some embodiments. As mentioned before, while virtual links may be used to connect physical and/or virtual appliances, in the example of FIG. 3, virtual links are used to connect virtual appliances. FIG. 3 shows an example of using virtual links to isolate communications for a particular tenant in a multitenancy scenario. In the example of FIG. 3, the multitenancy is provided by an internet service provider (ISP) for one or more customers (one or more tenants) of the ISP, though only one such tenant (the tenant associated with tenant site 310) is shown in the diagram. A tenant may pay the ISP for its services and also may own or rent a set of resources inside the data center/network of the ISP site. In addition to owning or renting resources at the ISP site, the tenant may also own or rent resources at its own premises.

In the example, system 300 includes ISP site 302, network 308, and tenant site 310. In various embodiments, ISP site 302 and tenant site 310 are different physical sites. In the example, ESM 312 and hypervisor 306 are installed on-site at ISP site 302. ISP site 302 may include one or more other ESMs besides ESM 312. Each ESM installed at ISP site 302 is logically connected to the physical resources that it manages. The ISP of ISP site 302 has created a layer two and/or three topology that is shared among at least some tenants, including the tenant of tenant site 310. As will be described below, ISP site 302 also includes set of resources 330 (network node(s) 320, firewall 324, virtual link 328, load balancer 326, and network node(s) 322) that is owned/rented by the tenant associated with tenant site 310. ISP site 302 may also include resources owned/rented by tenants other than the tenant of tenant site 310 that are not shown in FIG. 3. In the example, tenant site 310 includes user interface to ESM and/or VAs 314, which comprises a user interface through which a user (e.g., a normal administrator of a virtual appliance) at tenant site 310 can access ESM 312 installed at ISP site 302 and/or virtual appliances (e.g., firewall 324 and load balancer 326) that are owned/used by the tenant.

The following is an example of how ESM 312 at ISP site 302 may provision two virtual appliances (firewall 324 and load balancer 326) and also a virtual link to connect the two virtual appliances (virtual link 328) for the tenant of tenant site 310:

For example, the tenant of tenant site 310 may wish to add a firewall virtual appliance followed by a load balancer virtual appliance to its topology. To do so, a user (e.g., a normal administrator of a virtual appliance) of tenant site 310 may use user interface to ESM and/or VAs 314 to send a request to ESM 312 at ISP site 302 for a firewall virtual appliance that is connected to a load balancer virtual appliance. The request may also include other information such as, for example, how many interfaces each of the firewall and load balancer is to have and which interface of each of the firewall and load balancer is to be used to exchange data with each other. In some embodiments, user interface to ESM and/or VAs 314 comprises a client device that accesses ESM 312 via a REST interface and a graphical interface (e.g., running as a web application) and/or a command-line interface (e.g., running as a Python application).

After receiving the request from user interface to ESM and/or VAs 314, ESM 312 checks its resource pool to determine whether the physical and/or logical resources required to create the requested virtual appliances are available. In the event that the resources are available, ESM 312 sends a request to hypervisor 306 to provision the appropriate number of virtual machines to be configured into the requested firewall and load balancer virtual appliances. ESM 312 then pushes configuration information down to the virtual appliances provisioned by hypervisor 306. ESM 312 itself and/or via the provisioning administrator role with respect to the virtual appliances of the tenant of tenant 310 sends configuration information to configure the virtual appliances as firewall 324 and load balancer 326. The configuration information also determines that one specified interface, IF1, of firewall 324 and one specified interface, IF2, of load balancer 326 are to become virtual link-enabled (i.e., able to communicate over virtual link 328). ESM 312 then activates virtual link 328 for firewall 324 and load balancer 326 (e.g., by informing firewall 324 the IP address of interface IF2 of load balancer 326 and informing load balancer 326 of the IP address of interface IF1 of firewall 324).

The normal administrator of a virtual appliance at tenant site 310 is unable to change the configuration of virtual link 328 but can configure firewall 324 and load balancer 326 such that data may be exchanged between the two virtual appliances. In some embodiments, over time, firewall 324 and/or load balancer 326 may report data back to ESM 312, such as, for example, operational status information associated with virtual link 328. The normal administrator of a virtual appliance of tenant site 310 may learn of the operational status information associated with the interfaces of the respective firewall and load balancer virtual appliances directly via user interface to ESM and/or VAs 314 or by using user interface to ESM and/or VAs 314 to contact ESM 312, for example.

Because firewall 324 and load balancer 326, owned or rented by the tenant of tenant site 310, are only configured to communicate to each other over virtual link 328, segregation of tenant site 310's network from other networks sharing the same logical and physical infrastructure (e.g., provided by the ISP of ISP 302) is ensured because its user traffic data that passes between firewall 324 and load balancer 326 will not be received at any device associated with another tenant of the ISP of ISP site 302. Furthermore, by using virtual link 328, the physical infrastructure used by firewall 324 and load balancer 326 does not need to be instructed on how to route the IP addresses configured on the appliances by the tenant (e.g., the inner IP addresses of the virtual link encapsulation, as will be discussed further below).

A virtual link comprises a layer three point-to-point connection that connects one interface of a first virtual appliance to one interface of a second virtual appliance. In this example, interface IF1 of firewall 324 is configured to communicate only to interface IF2 of load balancer 326 over a private link, virtual link 328. Each of firewall 324 and load balancer 326 may also communicate with other network nodes, represented by 320 and 322, through other interfaces (e.g., interface IF2 of firewall 324 and interface IF1 of load balancer 326) that are not associated with virtual link 328.

As will be further described below, data is tunneled across the virtual link. For example, a data packet that is to be sent from interface IF2 of load balancer 326 will be encapsulated, tunneled across virtual link 328, and then decapsulated when it is received at interface IF1 of firewall 324.

Figure 4:
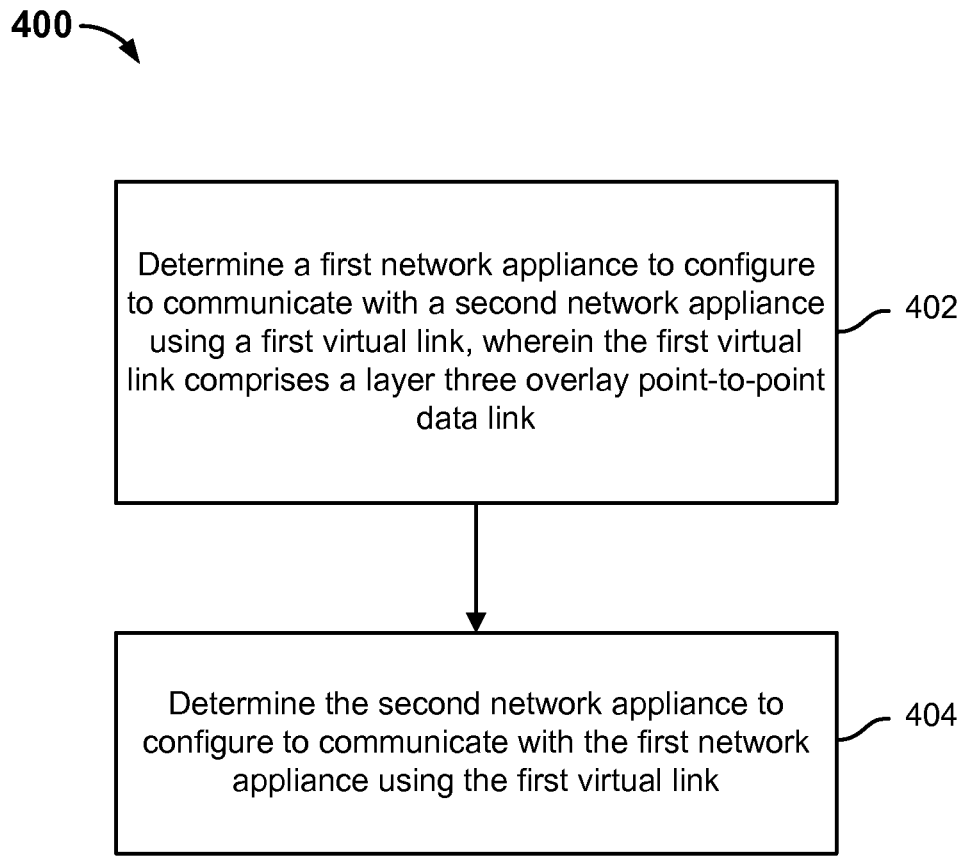
FIG. 4 is a flow diagram showing a process of implementing a virtual link for network appliances in accordance with some embodiments.

FIG. 4 is a flow diagram showing a process of implementing a virtual link for network appliances in accordance with some embodiments. In some embodiments, process 400 is implemented at system 100 of FIG. 1.

At 402, a first network appliance to configure to communicate with a second network appliance using a first virtual link is determined, wherein the first virtual link comprises a layer three overlay point-to-point data link. In various embodiments, the first (e.g., virtual and/or physical) network appliance to be connected to a second (e.g., virtual and/or physical) network appliance via a virtual link is determined (e.g., located). For example, the first network appliance may be an existing network appliance or a network appliance that is newly provisioned/obtained. In some embodiments, each of the first and second network appliances can be configured to perform one or more network services. Each of the first and second network appliances may perform the same or different network services. For example, each of the first and second network appliances performs a different network service and may be chained together via the virtual link. The virtual link comprises a point-to-link data link, because the virtual link allows data to be exchanged between one virtual link-enabled interface of the first network appliance and one virtual link-enabled interface of the second network appliance. In some embodiments, an outer interface corresponding to the virtual link-enabled interface of the first network appliance is specially configured to be used to connect to an outer interface corresponding to the virtual link-enabled interface of the second network appliance via the virtual link. Put another way, the virtual link outer interface of the first network appliance is configured to only send and receive data over the virtual link to the virtual link outer interface of the second network appliance and no other interface of the second network appliance or any other appliance.

At 404, the second network appliance to configure to communicate with the first network appliance using the first virtual link is determined. In various embodiments, the second network appliance to be connected to the first network appliance via the virtual link is determined (e.g., located). For example, the second network appliance may be an existing network appliance or a network appliance that is newly provisioned/obtained.

In some embodiments, an IP address is allocated to the outer interface corresponding to the virtual link-enabled interface of the first network appliance and an IP address is allocated to the outer interface corresponding to the virtual link-enabled interface of the second network appliance. In some embodiments, the IP address of the outer interface of each of the first and second network appliances is configured by the provisioning administrator. The first network appliance is informed of the IP address of the outer interface corresponding to the virtual link-enabled interface of the second network appliance and the second network appliance is informed of the IP address of the outer interface corresponding to the virtual link-enabled interface of the first network appliance to bring the virtual link active/up. Data is tunneled across the virtual link from the virtual link outer interface of the first network appliance to the virtual link outer interface of the second network appliance. Tunneling across the virtual link includes encapsulating a layer three data packet to be sent from the virtual link outer interface of the first network appliance with an outer header prior to sending the data packet. After crossing the virtual link and arriving at the virtual link outer interface of the second network appliance, the encapsulated data packet is decapsulated (e.g., the outer header of the data packet is stripped off) and processed. In various embodiments, the payload of the original layer three data packet may include user traffic data and/or control data. The data packet will be processed at the receiving network appliance either by the data plane or the control plane depending on whether respective user traffic data or control data is included in the payload.

In some embodiments, as will be described in further detail below, one or both of the first and second appliances will check the operational status of its virtual link-enabled interface and report the determined operational status to the ESM. For example, a network appliance may check the operational status of its virtual link-enabled interface by sending a data packet including at least control data from that virtual link interface to the remote virtual link interface of the other network appliance. In some embodiments, in the event that one or both of the first and second network appliances are removed or deleted, the virtual link between the first and second network appliances will also be automatically deleted.

Figure 5:
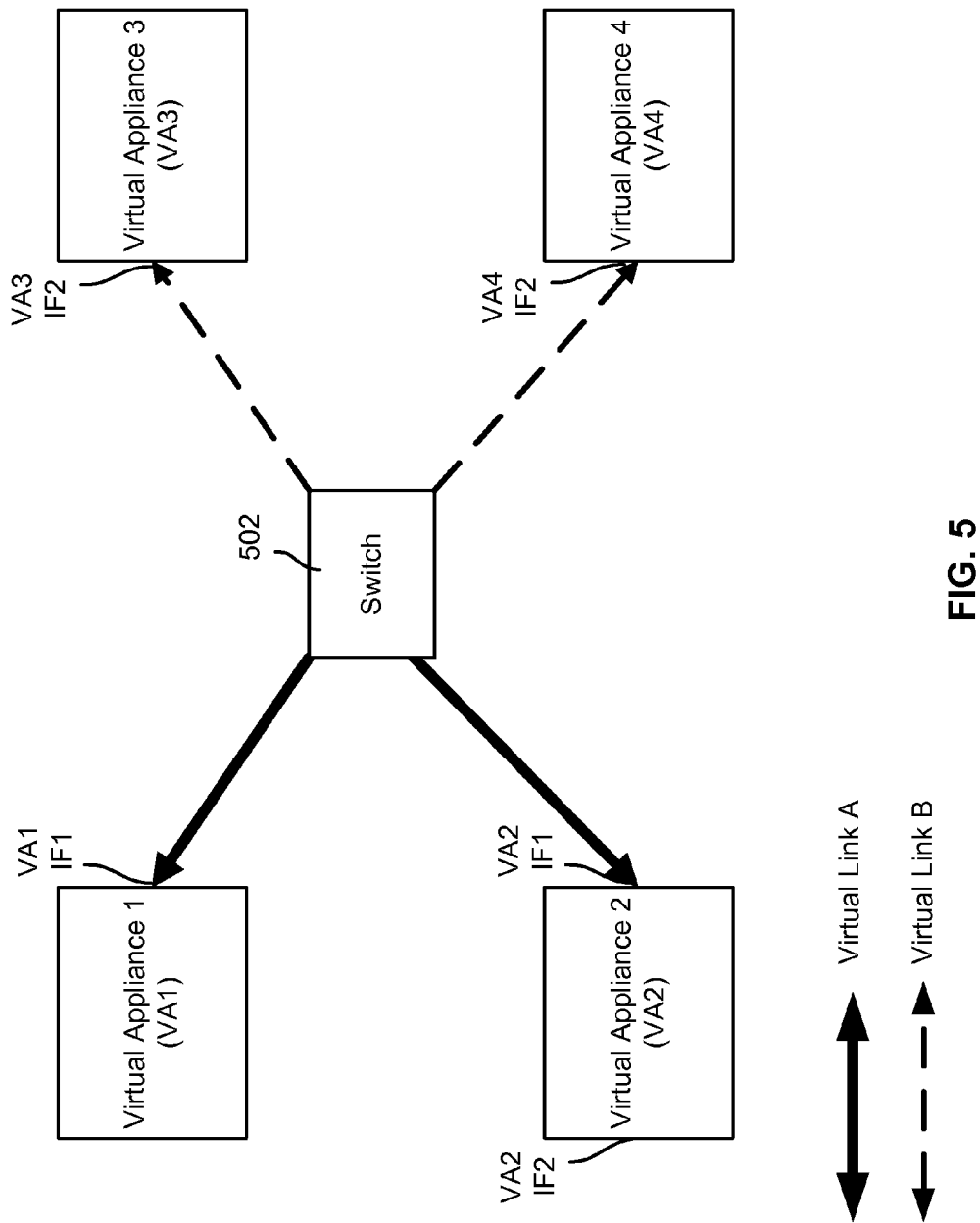
FIG. 5 is a diagram showing a topology that includes various virtual appliances connected by virtual links in accordance with some embodiments.

FIG. 5 is a diagram showing a topology that includes various virtual appliances connected by virtual links in accordance with some embodiments. As mentioned before, while virtual links may be used to connect physical and/or virtual appliances, in the example of FIG. 5, virtual links are used to connect virtual appliances. The example shows a simple topology in which a layer two switch, switch 502, is connected to one interface of each of four different virtual appliances: virtual appliance 1 (VA1), virtual appliance 2 (VA2), virtual appliance 3 (VA3), and virtual appliance 4 (VA4). Without configuring switch 502 to create VLANs, it is possible for any of the four virtual appliances to communicate with each other (e.g., a virtual appliance connected to one port of switch 502 may communicate with another virtual appliance connected to any other port of switch 502). However, it may not be desirable for all four virtual appliances to freely communicate with each other because some of the virtual appliances may belong to different parties. For example, in the ISP multitenancy scenario, different virtual appliances may belong to different tenants and each tenant's data should be isolated from another tenant's data. It is laborious to configure switch 502 to create VLANs (e.g., by limiting the communication to occur over only certain ports of the switch) to restrict the communication among the virtual appliances of different tenants. Also, once switch 502 is configured to create certain VLANs, the VLANs would be difficult to scale because each modification (e.g., an addition or removal of a virtual appliance) to the topology may require a corresponding reconfiguration of switch 502.

Nevertheless, virtual links may be used in some instances in place of or in addition to VLANS and without interference to existing VLANs to improve the security/isolation of communication between pairs of virtual appliances of the topology even if the virtual appliances are separated by one or more network nodes (e.g., switches or routers). In the example of FIG. 5, assume that VA1 and VA2 belong to Tenant A and are configured to communicate to each other and that VA3 and VA4 belong to Tenant B and are configured to communicate to each other. Instead of configuring switch 502 to create one VLAN that includes VA1 and VA2 and another VLAN that includes VA3 and VA4, virtual link A can be configured to connect VA1 and VA2 and virtual link B can be configured to connect VA3 and VA4. Virtual link A will ensure that data will only be passed between one interface, interface VA1 IF1, of VA1 and one interface, interface VA2 IF1, of VA2. Virtual link B will ensure that data will only be passed between one interface, interface VA3 IF2, of VA3 and one interface, interface VA4 IF2, of VA4. This way, the communication between VA1 and VA2 belonging to Tenant A will be isolated from VA3 and VA4, which belong to a different tenant, Tenant B. For example, Tenant A can choose an IP address for VA1 IF1 and Tenant B can choose the same IP address for VA3 IF2, without causing any conflicts, which would instead occur, for example, on the shared VLAN without virtual links.

As described above, virtual link A may be created between VA1 and VA2 as follows: the ESM will configure interface VA1 IF1 of VA1 to be virtual link-enabled so that it can serve as one interface of a virtual link and configure interface VA2 IF1 of VA2 to be virtual link-enabled so that it can serve as the other interface of the virtual link. Virtual link B may be created between VA3 and VA4 as follows: the ESM will configure interface VA3 IF2 of VA3 to be virtual link-enabled so that it can serve as one interface of a virtual link and configure interface VA4 IF2 of VA4 to be virtual link-enabled so that it can serve as the other interface of the virtual link. Existing physical layer two and layer three topologies are not required to be modified or configured when adding, modifying, or removing virtual links. Additional virtual appliances and virtual links may be added to the topology shown in FIG. 5.

In the event that a virtual appliance is deleted, a virtual link connecting that virtual appliance to another virtual appliance is deleted as well. For example, if VA1 were to be deleted from the topology, virtual link A will be automatically deleted as well, without need to reconfigure any other node in the topology. In some embodiments, if VA1 were migrated to a different physical device, virtual link A would still be maintained between VA1 and VA2 after the migration.

Figure 6:
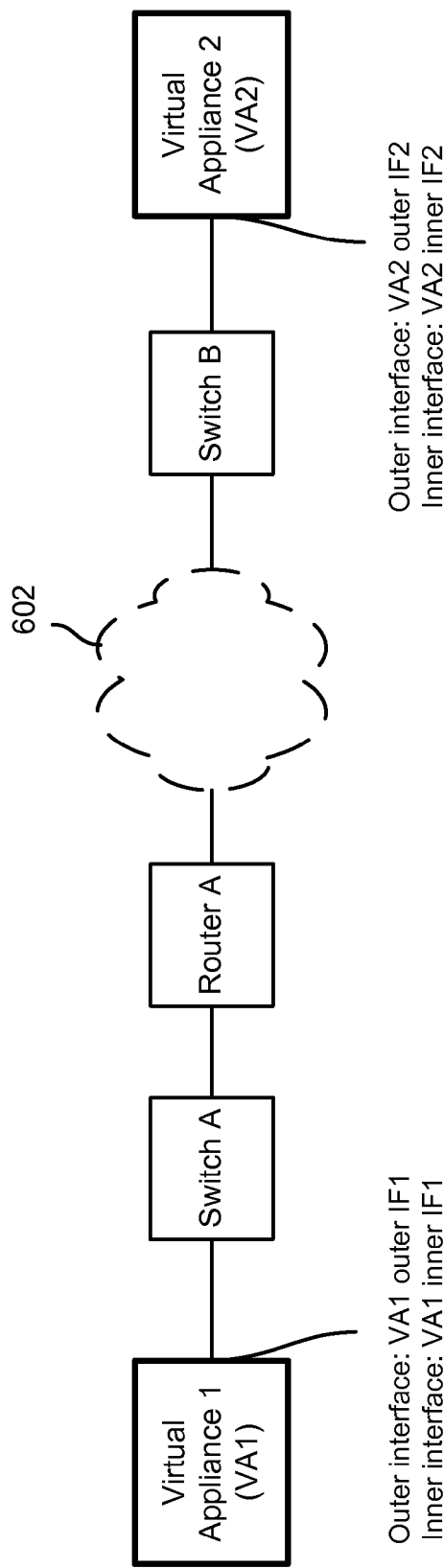
FIG. 6 is a diagram showing a topology that includes two virtual appliances in accordance with some embodiments.

FIG. 6 is a diagram showing a topology that includes two virtual appliances in accordance with some embodiments. As mentioned before, while virtual links may be used to connect physical and/or virtual appliances, in the example of FIG. 6, virtual links are used to connect virtual appliances. In the example of FIG. 6, the topology includes virtual appliance 1 (VA1), virtual appliance 2 (VA2), switch A, router A, switch B, and other network nodes 602. For example, other network nodes 602 represents the one or more other network nodes in between router A and switch B that are not depicted in the diagram. In the example, VA1 is connected to VA2 over a virtual link. Specifically, interface VA1 outer IF1 of VA1 is connected to interface VA2 outer IF2 of VA2 over the virtual link. The virtual link will allow data to be privately exchanged between interface VA1 inner IF1 of VA1 and interface VA2 inner IF2 of VA2, despite intermediary network nodes such as switch A, router A, switch B, and other network nodes 602.

In some embodiments, from a virtual appliance user's perspective, there are only "regular" interfaces of a virtual appliance. That any of the interfaces of a virtual appliance happens to be configured in a virtual link-enabled mode is transparent to the virtual appliance user (e.g., a normal administrator of the virtual appliance). A virtual link-enabled interface appears like a regular network interface to a virtual appliance user, with the exception of status reporting when the other end of the virtual link fails.

In some embodiments, from an ESM administrator's perspective, there are regular interfaces (that have a given set of configuration options, most notably, the "network" they are attached to) and there are virtual link-enabled interfaces (which have the same set of information attached, plus additional information required to configure the virtual link properly).

As mentioned above, in some embodiments, a virtual appliance that implements a virtual link has two interfaces associated with each user-visible, virtual link-enabled interface: the first interface is an "outer" interface, which is used to send and receive packets to/from the network, and the second interface is an "inner" interface that is used to carry user traffic. Whenever user traffic needs to be sent (i.e., whenever user traffic originates from the inner, user-visible interface), instead of being sent directly on the wire, the user-provided data packet gets processed by the virtual link data plane instead. This processing by the virtual link data plane will encapsulate the original data packet by adding a virtual link-related tunnel header. After the data packet is encapsulated, the encapsulated data packet is actually sent out of the source virtual appliance onto the wire through the outer interface. When the encapsulated data packet is received at the destination virtual appliance, the opposite procedure is followed. A packet is first received from the network through the outer interface of the destination virtual appliance. The encapsulated data packet is processed to remove the encapsulation header. After this is performed, the decapsulated data packet only contains user data. The decapsulated data packet can then be modified to appear to have been received by the user-visible, inner interface and is then processed as appropriate. In some embodiments, some additional processing (e.g., packet fragmentation/defragmentation) may be required in the transmission and reception code paths.

Each of the inner interface and outer interface of a virtual appliance is associated with a different IP address. In various embodiments, the outer interface is associated with an IP address that is assigned by the provisioning administrator (e.g., in the case of an ISP deployment, that interface is part of the ISP network infrastructure that the normal administrator of the virtual appliance has no knowledge of). In various embodiments, the inner interface acts like a non-virtual link-enabled interface as far as the normal administrator of the virtual appliance is concerned (notwithstanding that all traffic will get encapsulated and egress through the outer interface) and can be configured with whatever IP address the normal administrator of the virtual appliance desires.

As applied to the example of FIG. 6, assume that VA1 desires to send a layer three data packet to VA2 over the virtual link. The data packet is to be sent to VA2 by the outer interface (VA1 outer IF1) and is encapsulated between the corresponding inner interface (VA1 inner IF1) and the outer interface (VA1 outer IF1). The encapsulation added to the data packet allows the data packet to be correctly passed by any intermediary network nodes (e.g., switch A, router A, switch B, etc.) to eventually reach the outer interface of VA2 (VA2 outer IF2) and then to be correctly processed at VA2. Once the encapsulated data packet is received at the outer interface (VA2 outer IF2) of VA2, the outer interface of VA2 (VA2 outer IF2) is configured to pass the encapsulated data packet to the inner interface (VA2 inner IF2) of VA2. Between the outer and inner interfaces of VA2, the encapsulation is removed from the data packet and the data packet is modified to appear to have been received by the regular interface, the inner interface (VA2 inner IF2) of VA2.

In some embodiments, data tunneled between two virtual appliances over a virtual link may comprise one or both of user traffic data and control data. As will be described in further detail below, once a data packet is received and decapsulated at a virtual link-enabled interface of a virtual appliance, the data packet is either dispatched to a data plane for processing or a control plane for processing based on the determination of whether it includes user traffic data and/or control data.

Figure 7:
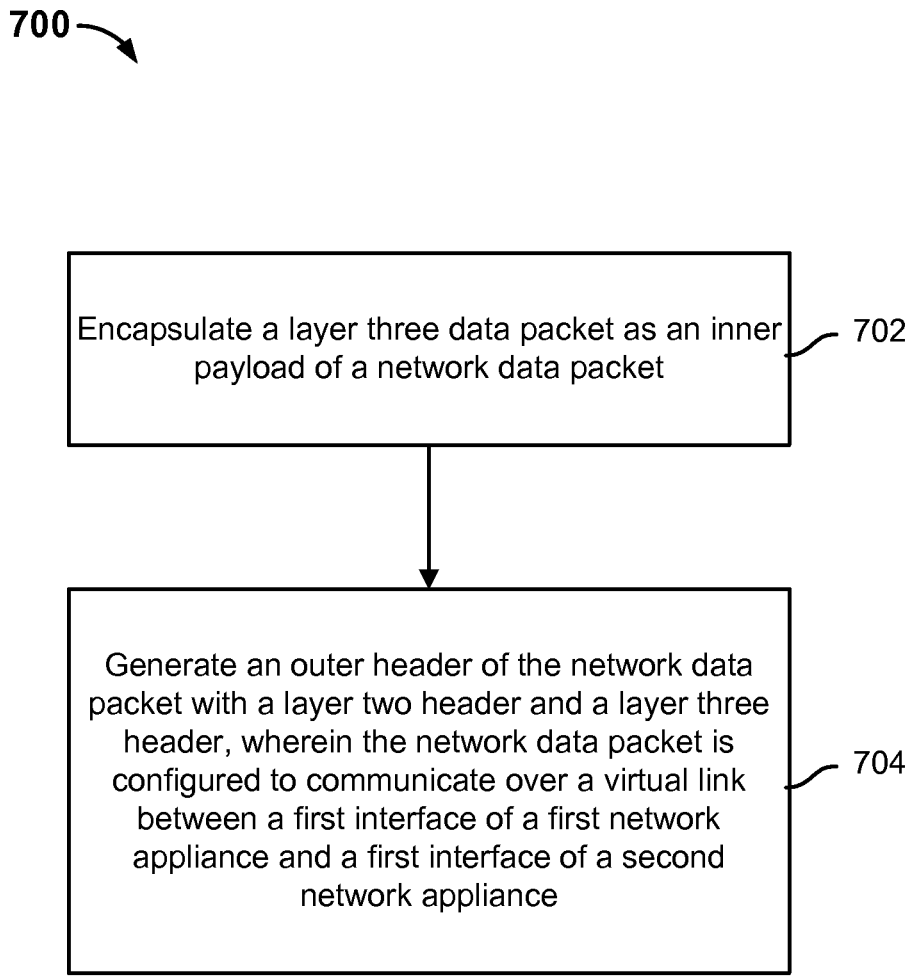
FIG. 7 is a flow diagram showing a process for configuring a network data packet for virtual link network communication in accordance with some embodiments.

FIG. 7 is a flow diagram showing a process for configuring a network data packet for virtual link network communication in accordance with some embodiments. In some embodiments, process 700 is implemented at system 100 of FIG. 1.

At 702, a layer three data packet is encapsulated as an inner payload of a network data packet. A layer three data packet that is to be sent from a first (e.g., virtual or physical) network appliance to a second (e.g., virtual or physical) network appliance is first encapsulated at the first network appliance prior to being sent. The payload of the original layer three data packet may include user traffic data and/or control data. The data packet is sent from one virtual link-enabled interface of the first network appliance to one virtual link-enabled interface of the second network appliance. In some embodiments, the data packet is encapsulated between the inner and outer interfaces corresponding to the virtual link-enabled interface of the first network appliance.

At 704, an outer header of the network data packet is generated with a layer two header and a layer three header, wherein the network data packet is configured to communicate over a virtual link between a first interface of a first network appliance and a first interface of a second network appliance. Encapsulating the data packet includes adding an outer header to the data packet. The outer header is configured to enable the data packet to be correctly dispatched from the virtual linked-enabled interface of the first network appliance to the appropriate virtual linked-enabled interface of the second network appliance and then to be correctly processed at the second network appliance. The outer header includes at least a layer two header (e.g., an Ethernet header) and a layer three header (e.g., an IP address header). The layer two header will enable the data packet to be correctly passed to another node on the same Ethernet network. The layer three header will enable the data packet to be correctly passed by any layer three nodes.

In some embodiments, in addition to the layer two header and the layer three header, a layer four header is also included in the outer header. The layer four header will help introduce variability for selection of physical resources (e.g., physical links) over which to send the data packet. In some embodiments, the layer four header included in the outer header of the encapsulation comprises a UDP header. As will be described in further detail below, the UDP source port value may be selected as a function of values (e.g., the source IP address, destination IP address, source port, and/or destination port values) from the inner header of the layer three data packet. In some embodiments, in addition to the layer two header, the layer three header, and a layer four header, a control plane header is also included in the outer header. As will be described further below, the control plane header may include information that the receiving interface of the second network appliance may use to correctly defragment (if needed), decapsulate, and divert the data packet to the appropriate type of processing.

When the network data packet is received at the virtual link-enabled interface of the second network appliance, the network data packet is decapsulated (e.g., the outer header is stripped off the original layer three data packet), defragmented (if needed), and diverted to the correct processing plane (e.g., the user plane or the control plane).

Figure 8:
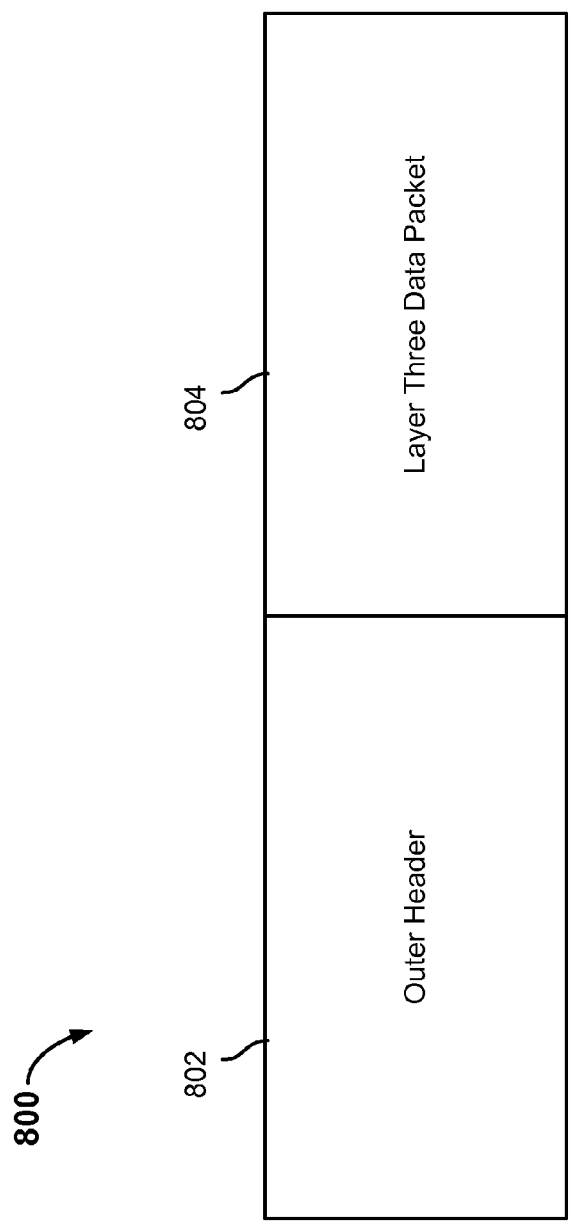
FIG. 8 is a diagram showing an encapsulated data packet in accordance with some embodiments.

FIG. 8 is a diagram showing an encapsulated data packet in accordance with some embodiments. As mentioned before, while virtual links may be used to connect physical and/or virtual appliances, in the example of FIG. 8, virtual links are used to connect virtual appliances. In the example of FIG. 8, network data packet 800 includes outer header 802 and layer three data packet 804. Network data packet 800 is sometimes referred to as an "encapsulated data packet." Layer three data packet 804 represents a user-provided data packet that is to be sent over a virtual link from a virtual link-enabled interface of a source virtual appliance. The payload of layer three data packet 804 may include user traffic data and/or control data. When layer three data packet 804 is encapsulated, in some embodiments, between the inner and outer interfaces corresponding to the virtual link-enabled interface of the source virtual appliance, outer header 802 is added to layer three data packet 804. Because outer header 802 is added to layer three data packet 804, layer three data packet 804 may be referred to as the inner payload of network data packet 800 and the original header of layer three data packet 804 may be referred to as the inner header. Network data packet 800 may be sent from the source virtual appliance to the virtual link-enabled interface of the destination virtual appliance. When network data packet 800 is received at the virtual link-enabled interface of the destination virtual appliance, in some embodiments, network data packet 800 is passed to the corresponding inner interface and outer header 802 is stripped off. Then layer three data packet 804 is processed in a manner determined based at least in part on outer header 802.

Figure 9:
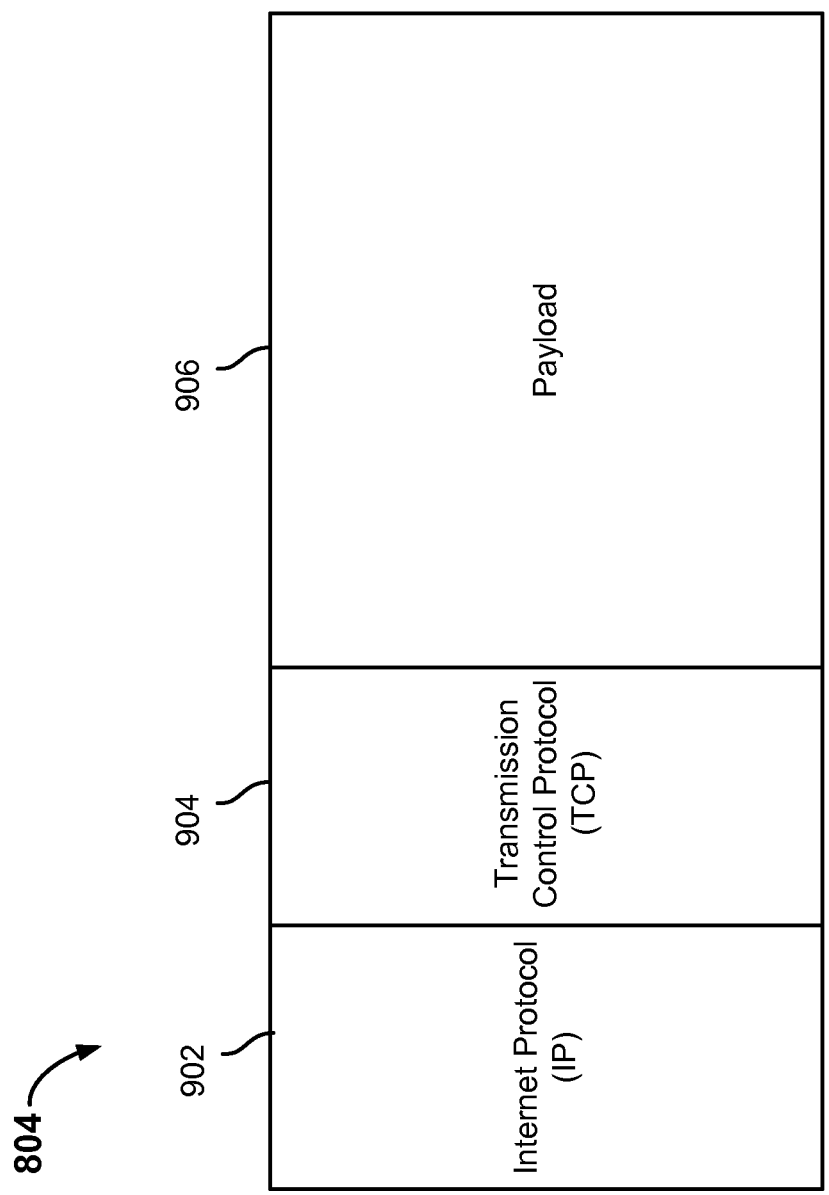
FIG. 9 is a diagram showing an original layer three data packet in accordance with some embodiments.

FIG. 9 is a diagram showing an original layer three data packet in accordance with some embodiments. As mentioned before, while virtual links may be used to connect physical and/or virtual appliances, in the example of FIG. 9, virtual links are used to connect virtual appliances. In some embodiments, layer three data packet 804 (the inner payload of the encapsulated data packet) of FIG. 8 is implemented using the example of FIG. 9. In the example, the layer three data packet includes IP header 902, TCP header 904, and payload field 906.

IP header 902 includes a source IP address, a destination IP address, a checksum, a size of the packet, and a Differentiated Services Code Point (DSCP). In some embodiments, IP header 902 may use the IPv4 protocol or the IPv6 protocol regardless of whether the outer header uses the IPv4 protocol or the IPv6. Put another way, the inner header of the encapsulated data packet may use the IPv4 protocol or the IPv6 protocol independently of whichever one of the IPv4 protocol or the IPv6 protocol is used in the outer header (e.g., the outer header of FIG. 10 or FIG. 8) of the encapsulated data packet. In some embodiments, the source IP and destination IP addresses of IP header 902 are picked by users of the system and may or may not be addresses assigned to the local system. It is possible that they correspond to the IP addresses assigned by ESM to virtual link outer interface. In some embodiments, a virtual appliance that implements a virtual link maintains two addressing domains: one for data packets before encapsulation and one for data packets after encapsulation. Address collisions are possible only inside a domain. Addresses can be legitimately reused across domains.

The DSCP value is a type of quality-of-service (QoS) value. In the ISP multitenancy example, the DSCP value in IP header 902 of this inner payload may be assigned by the tenant to whom the traffic belongs. In the enterprise example, the DSCP value in IP header 902 of this inner payload may be assigned by the enterprise based on the type of application to which the traffic belongs. As will be described further below, in some embodiments, a DSCP value in the outer header of the encapsulation of the layer three data packet may be determined based on the DSCP value of the IP header of the inner payload, IP header 902.

TCP header 904 includes a source port value and a destination port value.

Payload field 906 includes one or both of user traffic data and control data. User traffic data comprises data to be processed by a destination virtual appliance based on a network service that the virtual appliance is configured to provide. Control data comprises data that checks on an operational status and/or provides a different control signal to the destination virtual appliance. In some embodiments, data indicating whether payload field 906 includes at least control data is included in the control plane header of the outer header, as will be described in further detail below. In some embodiments, the traffic flow associated with the layer three data packet is identified based on a function of the source IP address, destination IP address, source port, and destination port values of the layer three data packet.

Figure 10:
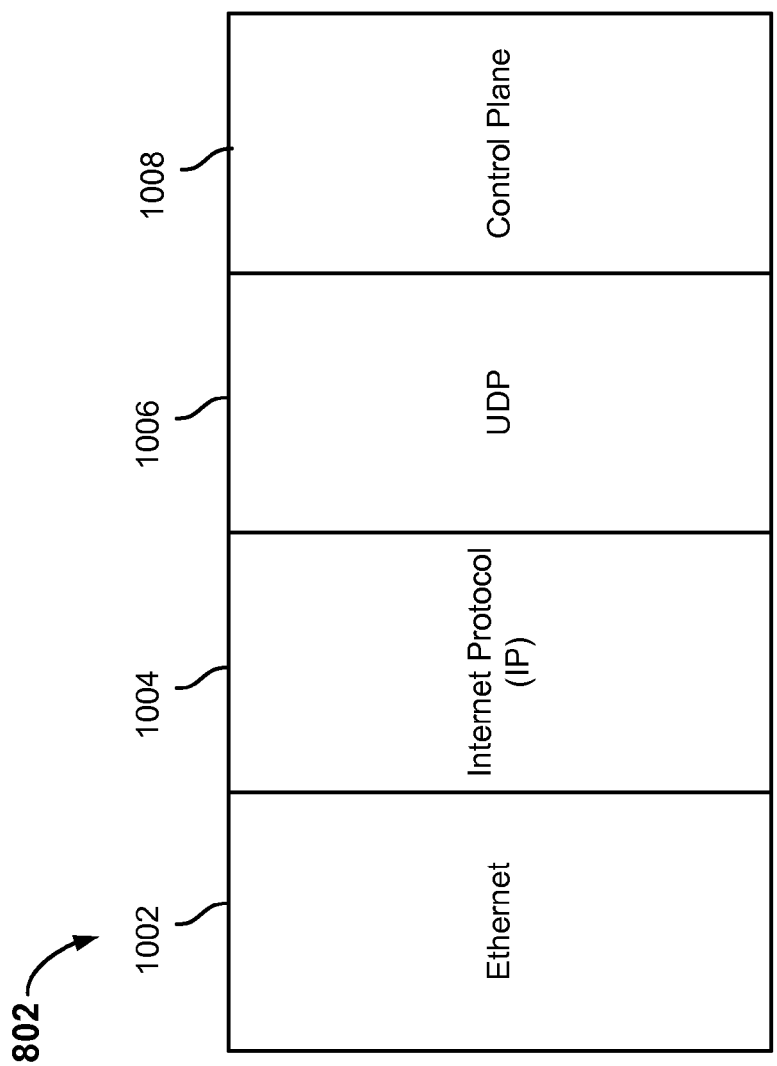
FIG. 10 is a diagram showing an outer header of a network data packet in accordance with some embodiments.

FIG. 10 is a diagram showing an outer header of a network data packet in accordance with some embodiments. In some embodiments, outer header 802 of FIG. 8 is implemented using the example of FIG. 10. In the example, the outer header includes Ethernet header 1002, IP header 1004, UDP header 1006, and control plane header 1008.

Ethernet field 1002, which is a layer two header, includes a source MAC address, a destination MAC address, and data associated with how to decode the value in IP header 1004. The source MAC address is the MAC address of the outer interface (as described with FIG. 6, above). The destination MAC address is as needed. In some cases, if the two outer interfaces of a virtual link are directly connected to the same network segment, switch or virtual switch, the destination MAC address is the MAC address of the destination virtual link outer interface. Otherwise a more complicated delivery mechanism is required and the MAC address will be computed properly according to normal IP forwarding algorithms and protocols.

IP header 1004, which is a layer three header, includes a source IP address, a destination IP address, a checksum, a size of the packet, and a DSCP value. In some embodiments, IP header 1004 may use the IPv4 protocol or the IPv6 protocol independently of whichever one of the IPv4 protocol or the IPv6 protocol is used in the inner header (e.g., IP header 902 of the layer three data packet described with FIG. 9). The source IP address of IP header 1004 of the outer header is the IP address of the local virtual link outer interface as assigned by the ESM for the source virtual appliance and the destination IP address of IP header 1004 of the outer header is the IP address of the destination virtual link outer interface assigned by the ESM for the destination virtual appliance. In some embodiments, the DSCP value of IP header 1004 of the outer header is determined based on the DSCP value of the IP header of the inner payload (e.g., IP header 902 of the layer three data packet described with FIG. 9). For example, in the enterprise scenario, because the enterprise assigns the DSCP values in the inner header of traffic of its various applications, the DSCP value in the inner header that is assigned for each application by the enterprise may also be used as the DSCP value of outer header IP header 1004. In some embodiments, the DSCP value of IP header 1004 of the outer header is not determined based on the DSCP value of the IP header of the inner payload. For example, in the ISP multitenancy scenario, because the ISP does not assign the DSCP value in the inner payload of each tenant's traffic, the DSCP value in the inner payload that is assigned by each tenant is not necessarily used as the DSCP value of IP header 1004 of the outer header. The ISP may assign a value to the DSCP of IP header 1004 of the outer header that is different from the DSCP value of the inner payload.

UDP header 1006, which comprises a layer four header, includes a source port value and a destination port value. In some embodiments, UDP header 1006 is included in the outer header. For better handling at the layer two and/or layer three level(s), it would be desirable to spread the network data packets over many physical links so that traffic does not become bottlenecked over only a few physical links. The value(s) of UDP header 1006 may be visible to layer two nodes (e.g., some switches performing link load balancing across multiple physical links) and therefore may be used by the layer two, three, or four nodes to determine which one of multiple possible physical links to send the network data packet over. For example, the UDP source port value may map a network data packet to a particular physical link and so different UDP source port values may map their respective network data packets to different physical links. Therefore, the range of physical links over which network data packets are sent may be increased by assigning various different UDP source port values to the network data packets. For example, a group of one or more different traffic flows may be assigned to a UDP source port value. Because a UDP source port value is assigned to a group of traffic flows, an entity (e.g., firewall) examining the network data packet may be able to use the UDP source port value of a network data packet to at least identify the group of traffic flows to which the layer three data packet belongs. Therefore, a UDP source port value in the outer header may provide a degree of visibility to the encapsulated traffic flow. A traffic flow may be identified by a function of the source IP address, destination IP address, source port, and destination port values of the inner payload (e.g., the layer three data packet such as the one described with FIG. 9). In some embodiments, the UDP source port value of a network data packet is determined as a (e.g., hash) function of the source IP address, destination IP address, source port, and destination port values of the inner header of the layer three data packet. In some embodiments, the UDP source port value that can be assigned to a network data packet is selected from a subset of all possible source port values. In some embodiments, the UDP source port value may be assigned for a virtual link (and subsequently, the encapsulated network data packets that are carried over the virtual link) by the ESM when provisioning the virtual link. In some embodiments, the UDP source port value is restricted to a range of UDP source port values smaller than the full space available. Placing a limit on the total number of possible UDP source port values to assign to network data packets may reduce the amount of firewall state table information that needs to be maintained, since each port consumes space. For example, only a predetermined range (e.g., a range of 16, 32, or 64 values) of all possible UDP source port values are assigned to network data packets.

Control plane header 1008 includes at least data related to fragmentation and whether the inner payload includes user traffic data and/or control data. An example of control plane header 1008 is further described with FIG. 11, below.

Figure 11:
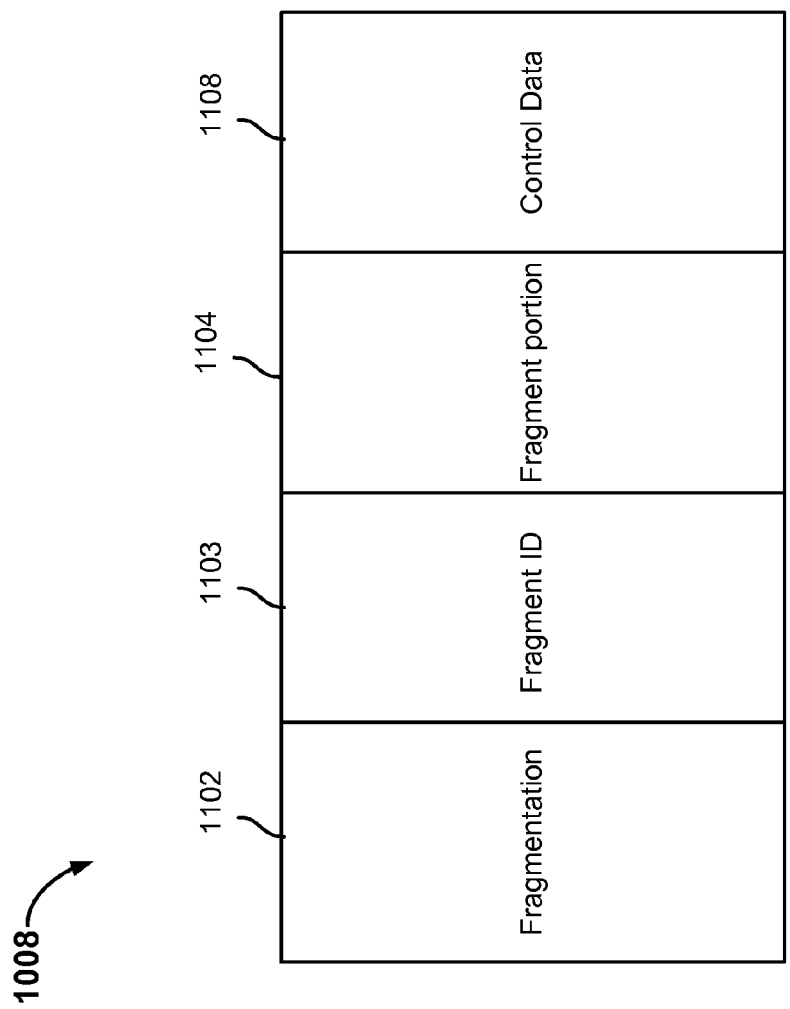
FIG. 11 is a diagram showing a control plane header of an outer header in accordance with some embodiments.

FIG. 11 is a diagram showing a control plane header of an outer header in accordance with some embodiments. In some embodiments, control plane header 1008 of FIG. 10 is implemented using the example of FIG. 11. In the example, the control plane header includes fragmentation field 1102, fragment ID field 1103, fragment portion field 1104, and control data field 1108.

Fragmentation field 1102 includes data indicating whether the inner payload of the encapsulated data packet (e.g., network data packet 800 of FIG. 8) comprises a fragment. In various embodiments, a "fragment" comprises a portion of the original layer three data packet. Fragment ID field 1103 includes identifying information associated with each original layer three data packet. If the original layer three data packet is fragmented, then each encapsulated data packet that includes a fragment of the data packet includes the same value for fragment ID field 1103 so that the fragments may be identified to be corresponding to the same data packet. Fragment portion field 1104 includes data that indicates whether the encapsulated data packet, if it includes a fragment of an original layer three data packet, includes a first portion of the original layer three data packet or the second portion of the original layer three data packet. A data packet needs to be fragmented if after it is encapsulated with the outer header (e.g., the outer header described with FIG. 10), the size of the encapsulated data packet is greater than a maximum transfer unit (MTU), which is the largest size of a frame that a layer two communications protocol can send. For example, the maximum transfer unit for Ethernet is 1,500 bytes. As such, in some embodiments, if it is determined that the size of the layer three data packet (e.g., layer three data packet 804 of FIG. 8) is larger than the MTU (e.g., 1,500 bytes) less the fixed size of the outer header (network data packet 800 of FIG. 8), then the layer three data packet is split into two fragments. In some embodiments, the layer three data packet is split into two fragments of equal size. For example, the reason the layer three data packet is split into two fragments of equal size is to minimize the probability of further IP-level fragmentation in the path between the source virtual link interface and the destination virtual link interface. IP fragmentation behaves differently, since, in most cases, the first fragment is always sized perfectly with the MTU size. In some embodiments of virtual link related fragmentation, subsequent to splitting the layer three data packet into two fragments, the first fragment will include a first portion of the layer three data packet and the second fragment will include a second portion of the layer three data packet. In some embodiments, a copy of the outer header is added to the front of each of the first fragment and the second fragment. Then, the copy of the outer header of each of the first and second fragments may be updated. For example, fragment portion field 1104 of the copy of the outer header of the first fragment is modified to include a value that indicates that the inner payload comprises a first fragment and fragment portion field 1104 of the copy of the outer header of the second fragment is modified to include a value that indicates that the inner payload comprises a second fragment. Also, fragmentation field 1102 of each outer header of the first and second fragments is updated to include a value that indicates that the encapsulated data packet comprises a fragment (as opposed to a whole layer three data packet). In the event that a layer three data packet does not need to be fragmented, in some embodiments, fragmentation field 1102 includes a value that indicates that the encapsulated data packet does not comprise a fragment and fragment portion field 1104 indicates neither a first fragment nor a second fragment (its value is ignored).

The destination virtual appliance may use the data of fragmentation field 1102, fragment ID field 1103, and fragment portion field 1104 to defragment (e.g., reassemble two corresponding fragments into a layer three data packet) received encapsulated data packets, if needed. For example, in the event that the destination virtual appliance receives an encapsulated data packet that includes one fragment (e.g., a first fragment or a second fragment) of the original layer three data packet, the destination virtual appliance will wait for the other fragment (e.g., a second fragment or a first fragment) to arrive and then combine the fragments back into the original layer three data packet.

Control data field 1108 includes data that identifies whether the inner payload of the encapsulated data packet includes at least control data. The inner payload of the encapsulated data packet may include one or both of user traffic data and control data. If any control data is included in the inner payload, then the data of control data field 1108 may indicate that control data is enclosed. Examples of control data may include an inquiry of the operational status of the virtual link interface of the destination virtual appliance, an indication that the source virtual appliance is currently busy, a message that the source virtual appliance is currently in an active operational status, or a challenge for authentication. A source virtual appliance may send control data in layer three data packets to a destination virtual appliance at the other end of a virtual link to inquire whether the operational status of the destination virtual appliance is active or inactive (e.g., an "Are you alive?" query). For example, if the source virtual appliance has not received any user traffic data from the destination virtual appliance after a configured interval, then the source virtual appliance may send a control message to the destination virtual appliance that queries whether the destination virtual appliance is still in operation. The destination virtual appliance may use the data of control data field 1108 to determine whether to process data packets as control data or as user traffic data. For example, processing the data packet as user traffic data may include performing a network service associated with the destination virtual appliance on the user traffic data. An example of processing the data packet as control data may include generating a reply control message (e.g., "I am still in operation") to be sent back to the virtual appliance from which the control data was sent.

Figure 12:
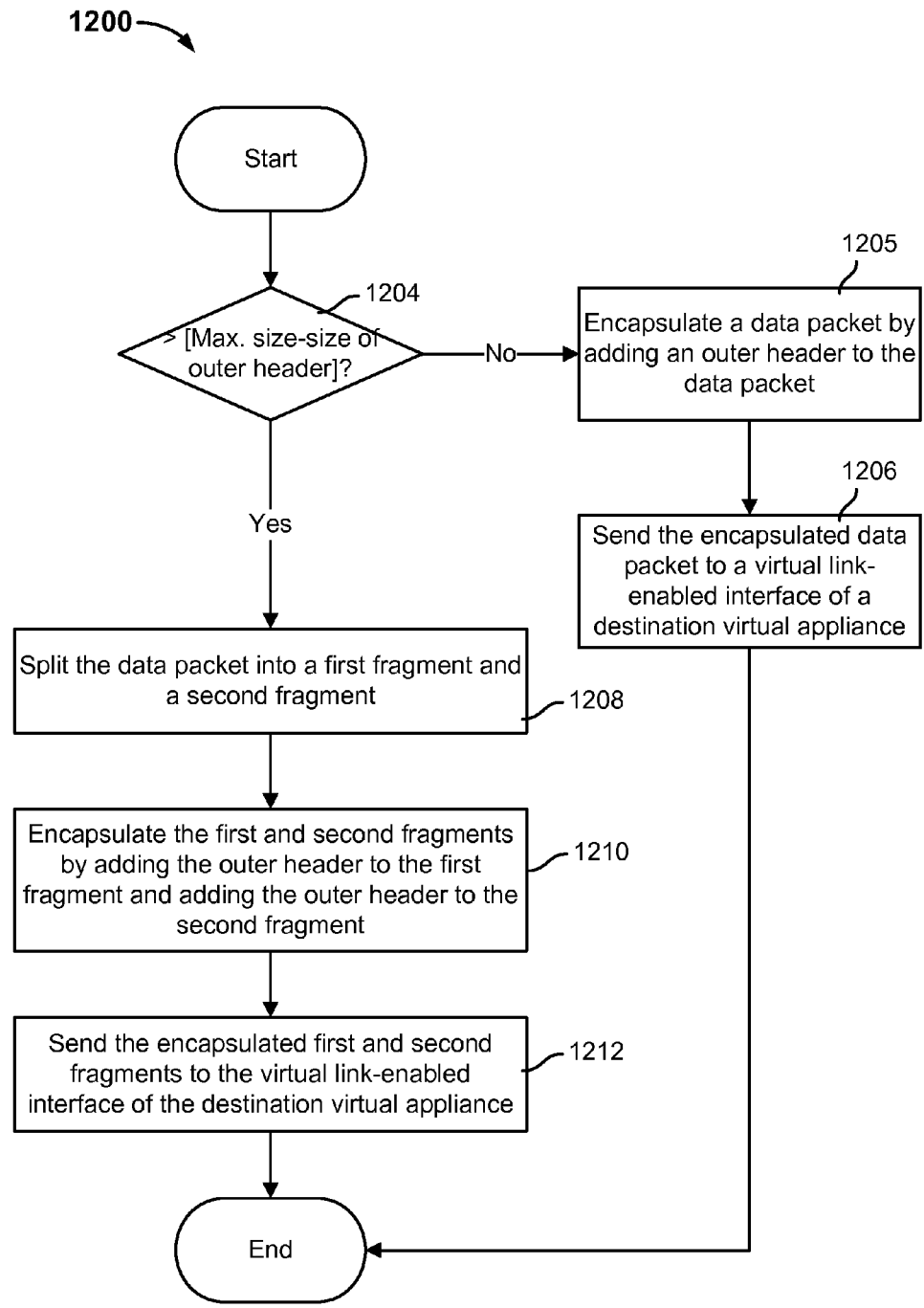
FIG. 12 is a flow diagram showing a process of fragmenting a data packet in accordance with some embodiments.

FIG. 12 is a flow diagram showing a process of fragmenting a data packet in accordance with some embodiments. As mentioned before, while virtual links may be used to connect physical and/or virtual appliances, in the example of FIG. 12, virtual links are used to connect virtual appliances. In some embodiments, process 1200 may be implemented at system 100 of FIG. 1.

Process 1200 shows an example process by which a data packet that is to be sent over a virtual link is fragmented. In some embodiments, process 1200 is implemented by an inner interface and/or between the inner interface and an outer interface of the source virtual appliance that is preparing to send the data packet. In various embodiments, the data packet comprises a layer three data packet.

At 1204, it is determined whether a size of a data packet exceeds a maximum transmission size (MTU) less a size of an outer header. In some embodiments, the outer header used to encapsulate a layer three data packet for virtual links comprises a fixed size. In various embodiments, the outer header includes an Ethernet header and an IP header. In some embodiments, in addition to the Ethernet header and the IP header, the outer header also includes a UDP header and/or a control plane header. In some embodiments, the outer header may be implemented using the example outer header of FIG. 10. For example, the MTU is 1,500 bytes. In the event that it is determined that the size of an original layer three data packet exceeds the [MTU—size of the outer header], control is transferred to 1208. In the event that it is determined that the size of the original layer three data packet does not exceed the [MTU—size of the outer header], control is transferred to 1205.

At 1205, a data packet is encapsulated by adding an outer header to the data packet. Because the size of the layer three data packet does not exceed the [MTU—size of the outer header], the layer three data packet does not need to be fragmented before it is encapsulated and sent.

At 1206, the encapsulated data packet is sent to a virtual link-enabled interface of a destination virtual appliance. After the encapsulated data packet is sent, process 1200 ends.

At 1208, the data packet is split into a first fragment and a second fragment. Because the size of the layer three data packet does exceed the [MTU—size of the outer header], the layer three data packet needs to be fragmented before it is sent. Thus, the layer three data packet is split into two fragments. In some embodiments, the layer three data packet is split into two fragments of equal size. One reason to split the layer three data packet into two fragments is to minimize the probability of further IP-level fragmentation in the path between the source virtual link outer interface and the destination virtual link interface. The first fragment (e.g., the front portion of the layer three data packet) includes a first portion of the layer three data packet, while the second fragment includes the remaining portion of the layer three data packet.

At 1210, the first and second fragments are encapsulated by adding the outer header to the first fragment and adding the outer header to the second fragment. A copy of the outer header is added to the front of the first fragment and another copy of the outer header is added to the front of the second fragment. In some embodiments, the outer headers of both the first fragment and the second fragment are updated to indicate that the inner payload of the encapsulated data packet contains a fragment (e.g., a first fragment or a second fragment) of a particular layer three data packet (e.g., as identified by a fragment ID).

At 1212, the encapsulated first and second fragments are sent to the virtual link-enabled interface of the destination virtual appliance. After the destination virtual appliance receives one fragment, it will wait to receive the corresponding fragment and use the two fragments to reassemble the original data packet.

The following is an example technique of determining whether both fragments of a layer three data packet are received at the destination virtual appliance: whenever a fragmented packet is received at the destination virtual appliance, its fragment ID (from the outer header) is compared against a cache of packet fragments that were previously received. If there is a match, it means that the other portion of that fragmented packet has already been received. In the case of a match, the other portion is removed from the cache, and the original layer three data packet gets reassembled and processed normally. However, if no match is found, the newly-received fragment is stored in the cache and waits for the other fragment to arrive. This mechanism handles the case where the two fragments arrive out of order (e.g., the second fragment can arrive before the first fragment) without any additional measures since it is always possible to reconstruct which fragment goes first from the information in the fragment's outer header. In case the second fragment never arrives at the destination virtual appliance, the cache has a clean-up mechanism that prevents packets from being stored indefinitely (e.g., garbage collection).

Figure 13:
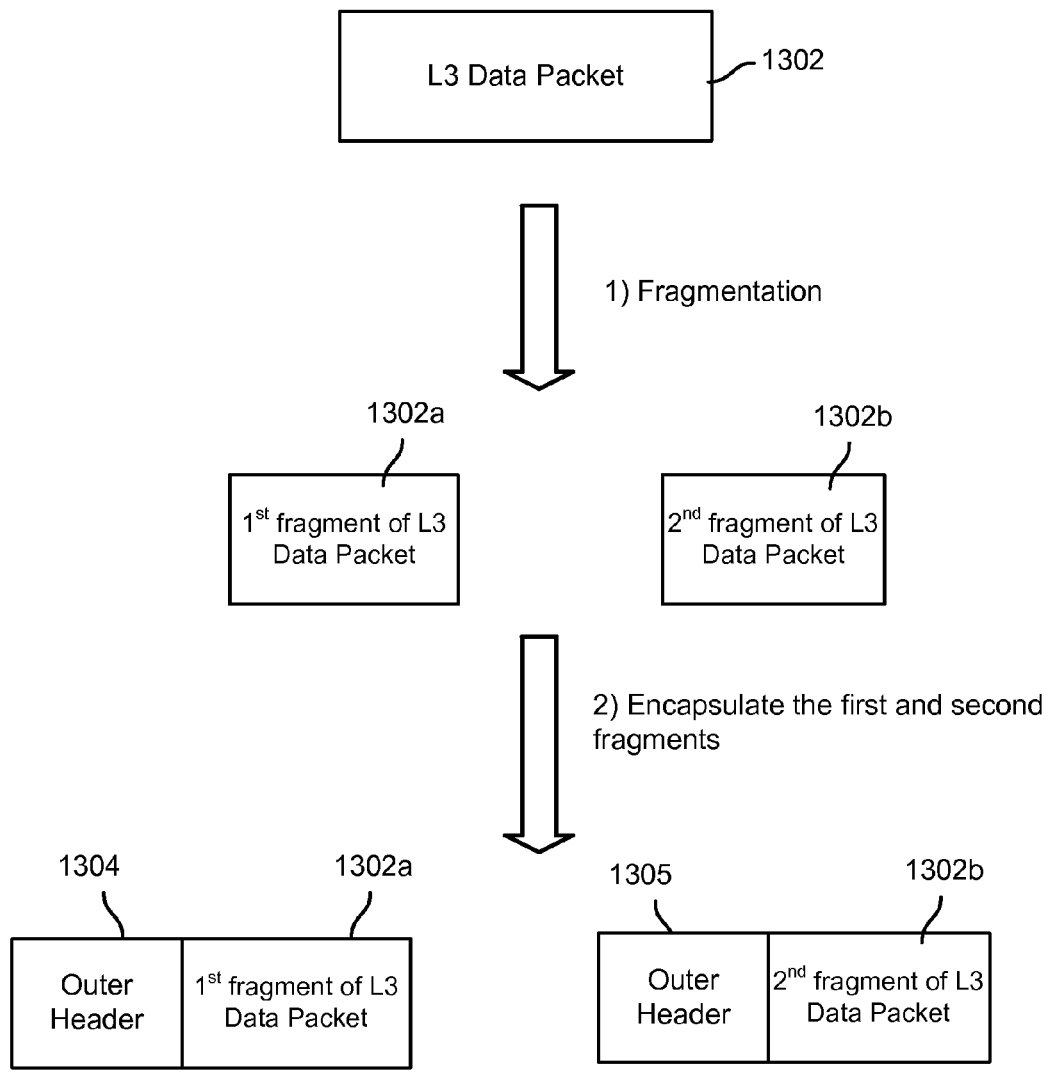
FIG. 13 is a diagram showing an example of fragmenting a data packet in accordance with some embodiments.

FIG. 13 is a diagram showing an example of fragmenting a data packet in accordance with some embodiments. As mentioned before, while virtual links may be used to connect physical and/or virtual appliances, in the example of FIG. 13, virtual links are used to connect virtual appliances. In the example of FIG. 13, assume that an interface of a source virtual appliance is connected to an interface of a destination virtual appliance over a virtual link. The example process of FIG. 13 may be implemented by an inner interface and/or between the inner interface and an outer interface of the source virtual appliance that is preparing to send the data packet. L3 (layer three) data packet 1302 is to be sent over a virtual link to a virtual link-enabled interface of a destination virtual appliance. In the first step, it is determined that the size of L3 data packet 1302 exceeds a given MTU less the size of the outer header (used for encapsulation) and so L3 data packet 1302 is to be split into two fragments. L3 data packet 1302 is fragmented into first fragment of L3 data packet 1302*a* and second fragment of L3 data packet 1302*b*. In the second step, two copies of the outer header to use for L3 data packet 1302 are generated: outer header 1304 and outer header 1305. To encapsulate the first and second fragments, outer header 1304 is added to the front of first fragment of L3 data packet 1302*a* and outer header 1305 is added to the front of second fragment of L3 data packet 1302*b*. Also, outer header 1304 of the first fragment is updated to indicate that the encapsulated data packet includes a first fragment of L3 data packet 1302 and outer header 1305 of the second fragment is updated to indicate that the encapsulated data packet includes a second fragment of L3 data packet 1302. Subsequently, the encapsulated first fragment of L3 data packet 1302 (outer header 1304 plus first fragment of L3 data packet 1302*a*) and the encapsulated second fragment of L3 data packet 1302 (outer header 1305 plus second fragment of L3 data packet 1302*b*) are sent over the virtual link to the virtual link-enabled interface of the destination virtual appliance.

Figure 14:
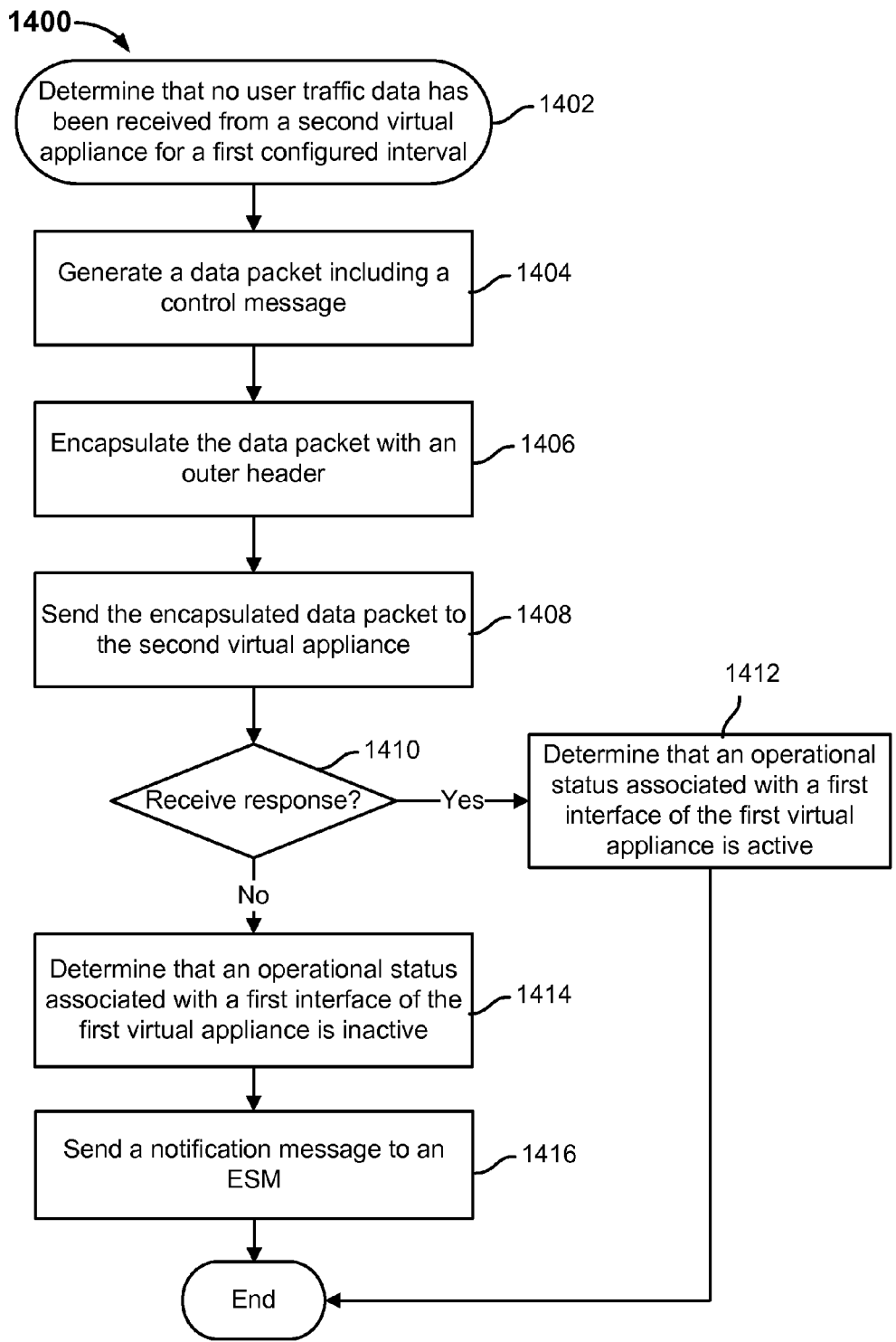
FIG. 14 is a flow diagram showing a process of determining the operational status of a virtual link-enabled interface of a virtual appliance in accordance with some embodiments.

FIG. 14 is a flow diagram showing a process of determining the operational status of a virtual link-enabled interface of a virtual appliance in accordance with some embodiments. As mentioned before, while virtual links may be used to connect physical and/or virtual appliances, in the example of FIG. 14, virtual links are used to connect virtual appliances. In the example of process 1400, assume that an interface of a first virtual appliance is connected to an interface of a second virtual appliance over a virtual link. In some embodiments, process 1400 is implemented by the first virtual appliance.

At 1402, it is determined that no user traffic data has been received from a second virtual appliance for a first configured interval. In some embodiments, one or more conditions may be set such that in the event that a condition is met, a virtual appliance is configured to send a control message determined based on the met condition to another virtual appliance at the end of the virtual link. The example condition used in 1402 is that no user traffic data has been received from the other virtual appliance for a first configured interval (e.g., 15 seconds).

At 1404, a data packet including a control message is generated. Because no user traffic data has been sent over this interval, the first virtual appliance is configured to generate a control message that inquires whether the remote interface of the virtual link associated with the second virtual appliance is still in an active operational status. The control message is included as a payload in a layer three data packet. For example, the control message may be used as payload 906 of the example layer three data packet described with FIG. 9.

At 1406, the data packet is encapsulated with an outer header. For example, the outer header may be implemented using the example outer header of FIG. 10. In some embodiments, the data packet may be fragmented (e.g., using a process such as process 1200 of FIG. 12), if applicable.

At 1408, the encapsulated data packet is sent to the second virtual appliance. The encapsulated data packet is sent via the outer interface of the virtual link associated with the first virtual appliance.

At 1410, it is determined whether a response has been received from the second virtual appliance. In some embodiments, a response from the second virtual appliance to the sent control message is waited for a second configured interval (e.g., 5 seconds) and if no response is received, then another control message is sent (e.g., control returns to 1404). In some embodiments, if no response is received after a third configured interval (e.g., 45 seconds) that is longer than the second configured interval, control is transferred to 1414. However, if a response is received, control is transferred to 1412.

At 1412, it is determined that an operational status associated with a first interface of the first virtual appliance is active. Because a response had been received, the first virtual appliance determines that the local interface of the virtual link associated with the first virtual appliance from which the encapsulated data packet is sent is still in active operational status. This is because the local interface of the virtual link associated with the first virtual appliance is still usable to reach the second virtual appliance. For example, the response may include a message that indicates that the second virtual appliance is still active.

At 1414, it is determined that the operational status associated with a first interface of the first virtual appliance is inactive. Because no response had been received, the first virtual appliance assumes that the local interface of the virtual link associated with the first virtual appliance from which the encapsulated data packet is sent is down or inactive. This is because the local interface of the virtual link associated with the first virtual appliance is no longer usable to reach the second virtual appliance.

At 1416, a notification message is sent to an ESM. In response to the determination that the local interface of the virtual link associated with the first virtual appliance is down or inactive, the first virtual appliance may send a notification message (e.g., via a management interface) to the ESM that controls the first virtual appliance, the second virtual appliance, and the virtual link in between the first and second virtual appliances. The notification message may indicate that the virtual link-enabled interface of the local, first virtual appliance is currently down or inactive. The ESM may in turn process the notification message, and based on other information collected by the ESM, present a message at the user interface of the administrator interface that indicates that either the virtual link-enabled interface of the first virtual appliance and/or the entire virtual link in between the first and second virtual appliances is down or inactive so that users of the first and second virtual appliances and an ESM administrator are warned. In some embodiments, in the event that one interface of a virtual link is determined to be inactive or down, the ESM may present a message at the user interface of the administrator interface that indicates that the entire virtual link is inactive or down. The ESM administrator may also determine whether to take action with respect to the inactive virtual link-enabled interface of the first virtual appliance.

Virtual links may be integrated into high-availability (HA) virtual appliances. Due to the design of virtual links, very little dynamic state is needed to restore connectivity after an HA failover (e.g., the automatic switching to a redundant device/system after the failure of the previously active device/system). The configuration information that is needed to send or receive a packet across a virtual link is mostly statically configured by the ESM using the provisioning administrator role of the virtual appliance. The static configuration (e.g., including the IP addresses of outer interfaces) is shared by all virtual appliances in the HA group regardless of their present role (e.g., active/standby). The only run-time state that changes is the next fragment ID to use, in case of fragmentation, and the contents of the fragmentation table (i.e., all those packets that have not been received completely). Assuming that an HA failover happens unexpectedly, losing these pieces of information is not critical and the system will recover automatically after losing a few packets (those that were pending at the time). The fragment ID value can be reset at any time without major disruption to the system as long as recently used fragment IDs do not get reused over and over again in close sequence. A simple strategy (e.g., resetting to 0 and increasing by one each time a packet is generated) is sufficient to prevent that from being the case.

Even though some traffic loss is possible in HA, a failover will not necessarily bring the virtual link down or generate a virtual link event because connectivity can resume almost instantaneously as soon as the HA operation is complete, as compared to other technologies that require a set-up phase to negotiate parameters between the two interfaces or synchronize other state information (e.g., open a TCP connection). A virtual link interface that did not fail might not even notice that something happened on the other virtual link interface.

The above HA description assumes an active-standby pair model where there are two twinned appliances, one of which actually works while the other one is monitoring it, waiting to take over should something bad happen. This is a typical HA arrangement but not the only one by any means.

In some embodiments, certain events generated by a virtual link may warrant an HA failover. For example, it might be possible to trigger an HA failover when the operational status of a virtual link becomes inactive/down.

The following are some example reasons why in some embodiments, fragmentation of an encapsulated data packet as described herein (e.g., with FIG. 12) is preferred over IP fragmentation: IP fragmentation is designed to solve a very generic problem, i.e., carrying packets that might be relatively large (for whatever reason, e.g., legacy protocols) on networks that support relatively small maximum transfer units. As an example, the minimum RFC-specified MTU for IPv4 support is 576 bytes; the largest possible IPv4 packet is around 64 kB. Historically, Ethernet networks (that are the most common technology to carry layer two frames but certainly not the only one) expose maximum frame sizes of around 1514 bytes, leaving 1500 MTU for IP. Even though this is much larger than 576 bytes, it is also much smaller than the maximum 64 kB.

In addition to this large size mismatch, IP was also designed to be implemented with minimal resources on a wide range of devices, some of which do not really have much in terms of computational capabilities. For these reasons, IP specifications allow for some leeway in the protocol implementation and dictate a fragment handling strategy that might not be optimal to use with virtual links, in some embodiments.

More specifically, a few drawbacks with IP fragmentation include, for example:

1) An IP packet might end up getting split in many fragments of any size. The "many fragments" derive from the fact that the MTU and maximum packet size might be very different. The "any size" is because the IP fragmentation mechanism is generic enough to have fragments smaller than the MTU, and each fragment might have a different size. The usual implementation tries to generate as few fragments as possible. This means that each fragment is made as large as possible, which might lead to further fragmentation if there is an additional hop in the network with a smaller MTU.

2) A relatively complicated state machine regulates how fragments are processed, how long they are stored and how they get merged. There are several corner cases of interest, like what happens if an implementation receives only the first and last fragment of a very large packet (it is impractical to pre-allocate all the memory needed to store the whole thing) and what happens if two fragments overlap (and have potentially different contents). These are only two examples but there are more. As it is often the case, a complicated state machine may be slow and inefficient to use.

Virtual links have additional restrictions that may not be allowed in a general-purpose protocol like IP but that do not detrimentally affect the use of virtual links. For example:

1) The ratio between the inner MTU and outer MTU can be kept under control. We can safely assume that each packet will yield at most two fragments. The purpose of the virtual link fragmentation is not to carry extremely large packets across a network with a low MTU, it is to expose the same MTU the outer interface has to the inner interface without a major loss of performance or functionality, so protocols that depend on MTU size having at least a certain value do not break. The additional overhead imposed on packets is around 50 bytes, not several kilobytes. Being restricted to two fragments can greatly simplify the amount of information needed to fragment and reassemble packets.

2) Virtual links may be used in an environment where various tunneling technologies might be in use at the same time, and therefore multiple encapsulations reducing the MTU are possible. For this reason, if the total number of fragments is known (and it is), it is much more convenient to generate equally sized fragments instead of including as much content as possible into a first fragment. This way each fragment will be sized~MTU/2 (since total initial size is original MTU+control plane header, which is usually small) and it is highly unlikely that fragmentation would happen again.

3) The destination virtual link interface is trusted, because in general, the infrastructure used by virtual links is assumed to be trusted. This means that several corner cases or security concerns can be safely ignored. The destination virtual link interface also behaves in a very specific manner, as opposed to the IP case where the destination virtual link interface might follow any implementation that complies with the RFC and it is up to the local virtual link interface to accept a wide range of potential behaviors, work around quirks, etc. This greatly simplifies the implementation of fragmentation and reassembly and makes it much more efficient.

4) In datacenter and enterprise-class networks, it is unlikely that packet fragments will be in flight along the network for minutes before getting to their destination. While IP fragmentation is optimized for a generic network, virtual link fragmentation takes into account several factors, assuming that, for example, if a fragment does not arrive close to the other fragment of the same packet, then it probably will not arrive at all.

5) IP fragmentation works at the IP level, meaning that the original layer four headers of the packet will be present only in the first fragment (which may not necessarily be transmitted first). Including the original layer four headers of the packet in only the first fragment may be deficient because it might force intermediate systems like firewalls to delay and/or reassemble packets for inspection, then fragment them again; or it might affect load-balancing strategies that do inspect layer four headers.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
encapsulate a layer three data packet as an inner payload of a network data packet; and
generate an outer header of the network data packet with a layer two header and a layer three header, wherein the network data packet is configured to communicate over a virtual link between a first interface of a first network appliance and a first interface of a second network appliance, wherein an IP protocol used by the outer header is configured to be independent from an IP protocol used in an inner header of the layer three data packet; and
a memory coupled to the processor and configured to provide the processor with instructions.

2. The system of claim 1, wherein the layer two header of the outer header comprises an Ethernet header and the layer three header of the outer header comprises an Internet Protocol (IP) header.

3. The system of claim 1, wherein the outer header further includes a layer four header that is usable to determine a physical link over which to send the network data packet.

4. The system of claim 1, wherein the outer header further includes a layer four header, wherein a source port value in the layer four header is selected based at least in part on one or more values from a header associated with the layer three data packet.

5. The system of claim 1, wherein the outer header further includes a layer four header, wherein a source port value in the layer four header is selected from a predetermined range of source port values.

6. The system of claim 1, wherein the outer header further includes a layer four header, wherein a source port value is usable at least in part to identify the layer three data packet.

7. The system of claim 1, wherein the outer header further includes a control plane header that includes data that indicates whether the layer three data packet includes at least control data.

8. The system of claim 1, wherein the layer three data packet includes at least control data associated with a query for an operational status, wherein the processor is further configured to:
send the network data packet from the first interface of the first network appliance to the first interface of the second network appliance;
determine whether a response is received from the second network appliance; and
determine operational status associated with the first interface of the first network appliance based at least in part on the determination of whether the response is received from the second network appliance.

9. The system of claim 1, wherein the outer header further includes a control plane header that includes data that indicates whether the layer three data packet includes fragmentation data.

10. The system of claim 1, wherein the layer two header of the outer header includes a quality-of-service value.

11. The system of claim 1, wherein the layer two header of the outer header includes a first quality-of-service value that is determined based at least in part on a second quality-of-service value included in a layer two header of the layer three data packet.

12. The system of claim 1, wherein the layer two header of the outer header includes a first quality-of-service value that is selected by a service provider in a multitenancy environment.

13. The system of claim 1, wherein the processor is further configured to:
determine that the data packet exceeds a predetermined maximum size less a size associated with the outer header;
in response at least in part to the determination, split the data packet into a first fragment and a second fragment;
encapsulate the first fragment and the second fragment by adding the outer header to the first fragment and adding the outer header to the second fragment; and
send the encapsulated first fragment and the encapsulated second fragment to the first interface of the second network appliance.

14. The system of claim 1, wherein the processor is further configured to:
determine that the data packet exceeds a predetermined maximum size less a size associated with the outer header;
in response at least in part to the determination, split the data packet into a first fragment and a second fragment, wherein a size of the first fragment is the same as a size of the second fragment;

encapsulate the first fragment and the second fragment by adding the outer header to the first fragment and adding the outer header to the second fragment; and send the encapsulated first fragment and the encapsulated second fragment to the first interface of the second network appliance.

15. The system of claim 1, wherein the network data packet is configured to cross a layer three boundary.

16. The system of claim 1, wherein the outer header is configured to be compliant with one or more IP protocols used in an inner header of the layer three data packet.

17. A method, comprising:

encapsulating a layer three data packet as an inner payload of a network data packet; and generating an outer header of the network data packet with a layer two header and a layer three header, wherein the network data packet is configured to communicate over a virtual link between a first interface of a first network appliance and a first interface of a second network appliance, wherein an IP protocol used by the outer header is configured to be independent from an IP protocol used in an inner header of the layer three data packet.

18. The method of claim 17, wherein the layer two header of the outer header comprises an Ethernet header and the layer three header of the outer header comprises an Internet Protocol (IP) header.

19. The method of claim 17, wherein the layer three data packet includes at least control data associated with a query for an operational status and further comprising:

sending the network data packet from the first interface of the first network appliance to the first interface of the second network appliance;

determining whether a response is received from the second network appliance; and determining operational status associated with the first interface of the first network appliance based at least in part on the determination of whether the response is received from the second network appliance.

20. The method of claim 17, wherein the outer header further includes a control plane header that includes data that indicates whether the layer three data packet includes fragmentation data.

21. The method of claim 17, further comprising:

determining that the data packet exceeds a predetermined maximum size less a size associated with the outer header;

in response at least in part to the determination, splitting the data packet into a first fragment and a second fragment;

encapsulating the first fragment and the second fragment by adding the outer header to the first fragment and adding the outer header to the second fragment; and sending the encapsulated first fragment and the encapsulated second fragment to the first interface of the second network appliance.

22. A computer program product, the computer program product being embodied in a non-transitory computer readable storage medium and comprising computer instructions for:

encapsulating a layer three data packet as an inner payload of a network data packet; and generating an outer header of the network data packet with a layer two header and a layer three header, wherein the network data packet is configured to communicate over a virtual link between a first interface of a first network appliance and a first interface of a second network appliance, wherein an IP protocol used by the outer header is configured to be independent from an IP protocol used in an inner header of the layer three data packet.

23. The computer program product of claim 22, wherein the layer two header of the outer header comprises an Ethernet header and the layer three header of the outer header comprises an Internet Protocol (IP) header.

24. The computer program product of claim 22, wherein the outer header further includes a layer four header that is usable to determine a physical link over which to send the network data packet.

25. The computer program product of claim 22, wherein the outer header further includes a layer four header, wherein a source port value in the layer four header is selected based at least in part on one or more values from a header associated with the layer three data packet.

* * * * *